United States Patent
Kumar et al.

(10) Patent No.: US 11,682,069 B2
(45) Date of Patent: Jun. 20, 2023

(54) EXTENDING FINITE RANK DEEP KERNEL LEARNING TO FORECASTING OVER LONG TIME HORIZONS

(71) Applicant: INTUIT INC., Mountain View, CA (US)

(72) Inventors: Sricharan Kallur Palli Kumar, Mountain View, CA (US); Sambarta Dasgupta, Mountain View, CA (US); Sameeksha Khillan, Mountain View, CA (US)

(73) Assignee: INTUIT, INC., Mountain View, CA (US)

(*) Notice: Subject to any disclaimer, the term of this patent is extended or adjusted under 35 U.S.C. 154(b) by 489 days.

(21) Appl. No.: 16/881,172

(22) Filed: May 22, 2020

(65) Prior Publication Data
US 2021/0042820 A1    Feb. 11, 2021

Related U.S. Application Data
(60) Provisional application No. 62/883,001, filed on Aug. 5, 2019.

(51) Int. Cl.
| | |
|---|---|
| *G06N 20/00* | (2019.01) |
| *G06N 3/084* | (2023.01) |
| *G06N 3/047* | (2023.01) |
| *G06Q 40/02* | (2023.01) |

(52) U.S. Cl.
CPC ............ *G06Q 40/02* (2013.01); *G06N 3/047* (2023.01); *G06N 3/084* (2013.01); *G06N 20/00* (2019.01)

(58) Field of Classification Search
CPC ...... G06Q 40/02; G06N 20/00; G06N 3/0472; G06N 3/084
See application file for complete search history.

(56) References Cited

U.S. PATENT DOCUMENTS
| | | | |
|---|---|---|---|
| 2007/0071209 A1* | 3/2007 | Horvitz ............... | G06Q 10/109 379/201.06 |
| 2019/0108444 A1* | 4/2019 | Song ..................... | G06N 3/082 |
| 2019/0340467 A1* | 11/2019 | Celia ................... | G06F 16/2379 |

(Continued)

OTHER PUBLICATIONS

Tossou, Prudencio, Basile Dura, Francois Laviolette, Mario Marchand, and Alexandre Lacoste. "Adaptive deep kernel learning." arXiv preprint arXiv:1905.12131 (2019). (Year: 2019).*

(Continued)

*Primary Examiner* — Casey R. Garner
(74) *Attorney, Agent, or Firm* — Patterson + Sheridan, LLP

(57) ABSTRACT

In one embodiment a finite rank deep kernel learning method includes: receiving a training dataset; forming a plurality of training data subsets from the training dataset; for each respective training data subset of the plurality of training data subsets: calculating a subset-specific loss based on a loss function and the respective training data subset; and optimizing a model based on the subset-specific loss; determining a set of embeddings based on the optimized model; determining, based on the set of embeddings, a plurality of dot kernels; combining the plurality of dot kernels to form a composite kernel for a Gaussian process; receiving live data from an application; and predicting a plurality of values and a plurality of uncertainties associated with the plurality of values simultaneously using the composite kernel.

16 Claims, 13 Drawing Sheets

(56) References Cited

U.S. PATENT DOCUMENTS

2020/0372327 A1* 11/2020 Qiu ........................ G06N 20/10
2021/0334656 A1* 10/2021 Sjögren ................ G05B 23/024

OTHER PUBLICATIONS

Dasgupta, Sambarta, Kumar Sricharan, and Ashok Srivastava. "Finite rank deep kernel learning." In Third workshop on Bayesian Deep Learning, NeurIPS. 2018. (Year: 2018).*

Song, Huan, Jayaraman J. Thiagarajan, Prasanna Sattigeri, and Andreas Spanias. "Optimizing kernel machines using deep learning." IEEE transactions on neural networks and learning systems 29, No. 11 (2018): 5528-5540. (Year: 2018).*

Prudencio Tossou et al : "Adaptive Deep Kernel Learning", May 28, 2019 (May 28, 2019), XP055726222, Retrieved from the Internet: URL:https://arxiv.org/pdf/1905.12131.pdf [retrieved on Sep. 1, 2020] p. 2-p. 5 p. 8 and p. 11-p. 12.

Sambarta Dasgupta et al: "Finite Rank Deep Kernel Learning", 32nd Conference on Neural Information Processing Systems (NEURIPS 2018): Montreal, Canada, Dec. 3-8, 2018, Red Hook, NY: Curran Associates, Inc, US.

International Search Report/Written Opinion issued to PCT/US2020/035057 dated Sep. 11, 2020.

* cited by examiner

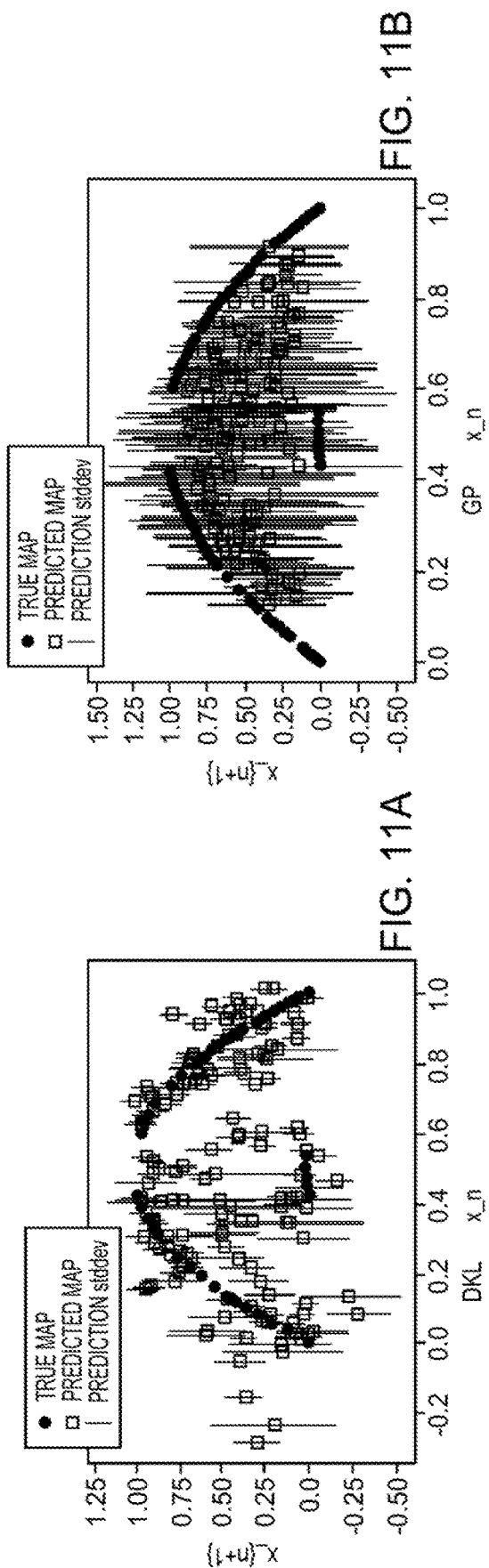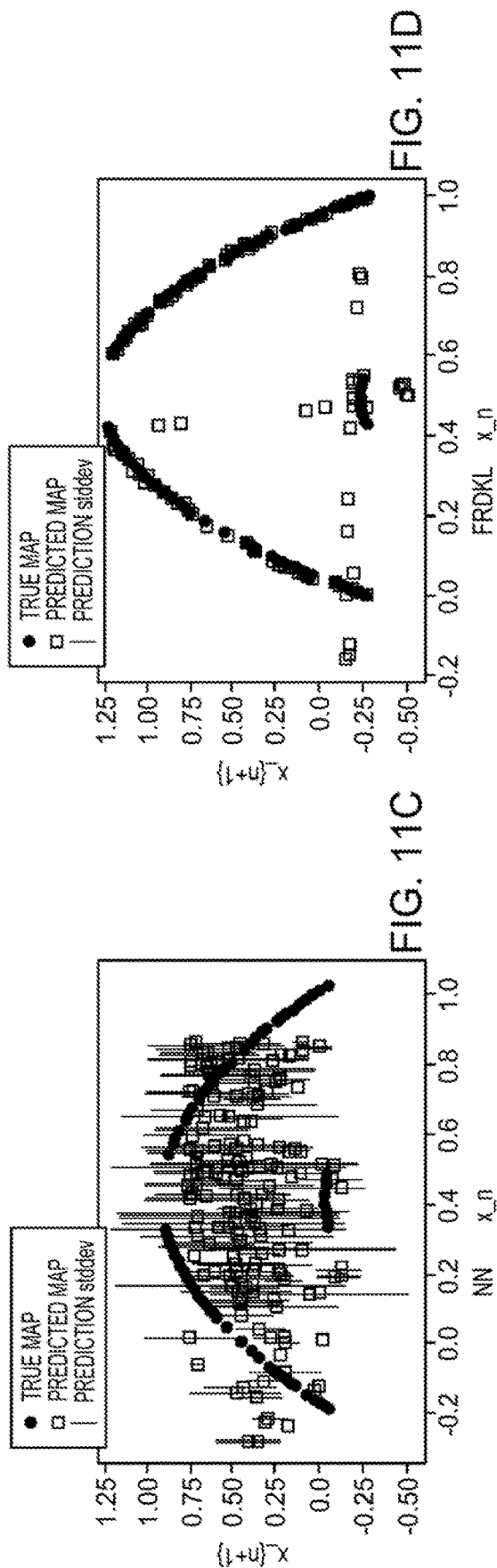
FIG. 11A  FIG. 11B  FIG. 11C  FIG. 11D

EXTENDING FINITE RANK DEEP KERNEL LEARNING TO FORECASTING OVER LONG TIME HORIZONS

CROSS-REFERENCE TO RELATED APPLICATIONS

This Application claims the benefit of U.S. Provisional Patent Application No. 62/883,001, filed on Aug. 5, 2019, the entire contents of which are incorporated herein in their entirety.

INTRODUCTION

Aspects of the present disclosure relate to computationally efficient methods for forecasting values with confidence intervals based on datasets with complex geometries (e.g., time series data).

Forecasting with simultaneous quantification of uncertainty in the forecast has emerged as a problem of practical importance for many application domains, such as: computer vision, time series forecasting, natural language processing, classification, and regression, to name a few. Recent research has focused on deep learning techniques as one possible approach to provide suitable forecasting models, and several approaches have been studied to characterize uncertainty in the deep learning framework, including: dropout, Bayesian neural networks, ensemble-based models, calibration-based models, neural processes, and deep kernel learning. Of these various approaches, deep kernel learning has emerged as a useful framework to forecast values and characterize uncertainty (alternatively, confidence) in the forecasted values simultaneously. In particular, deep kernel learning has proven useful for forecasting time series datasets with complex geometries.

Deep kernel learning combines deep neural network techniques with Gaussian process. In this way, deep kernel learning combines the capacity of approximating complex functions of deep neural network techniques with the flexible uncertainty estimation framework of Gaussian process.

Unfortunately, deep kernel learning is computationally expensive—generally $O(n^3)$, where n is the number of training data points. Thus, when applied to organizations' ever larger and more complex datasets, deep kernel learning may require significant amounts of time and processing resources to operate. And as datasets get larger, the problem grows significantly non-linearly. Consequently, organizations are forced to invest significant resource in additional and more powerful on-site computing resources and/or to offload the processing to cloud-based resources, which are expensive and which may create security concerns for certain types of data (e.g., financial data, personally identifiable data, health data, etc.

Accordingly, what is needed is a framework for reducing the computational complexity of deep kernel learning while still being able to forecast and characterize uncertainty simultaneously.

BRIEF SUMMARY

Certain embodiments provide a method for performing finite rank deep kernel learning, including: receiving a training dataset; forming a plurality of training data subsets from the training dataset; for each respective training data subset of the plurality of training data subsets: calculating a subset-specific loss based on a loss function and the respective training data subset; and optimizing a model based on the subset-specific loss; determining a set of embeddings based on the optimized model; determining, based on the set of embeddings, a plurality of dot kernels; combining the plurality of dot kernels to form a composite kernel for a Gaussian process; receiving live data from an application; and predicting a plurality of values and a plurality of uncertainties associated with the plurality of values simultaneously using the composite kernel.

Other embodiments comprise systems configured to perform the aforementioned finite rank deep kernel learning method as well as other methods disclosed herein. Further embodiments comprise a non-transitory computer-readable storage mediums comprising instructions for performing the aforementioned finite rank deep kernel learning method as well as other methods disclosed herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIGS. 11A-11D depict a third example simulation comparing the performance of different modeling techniques, including deep kernel learning.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
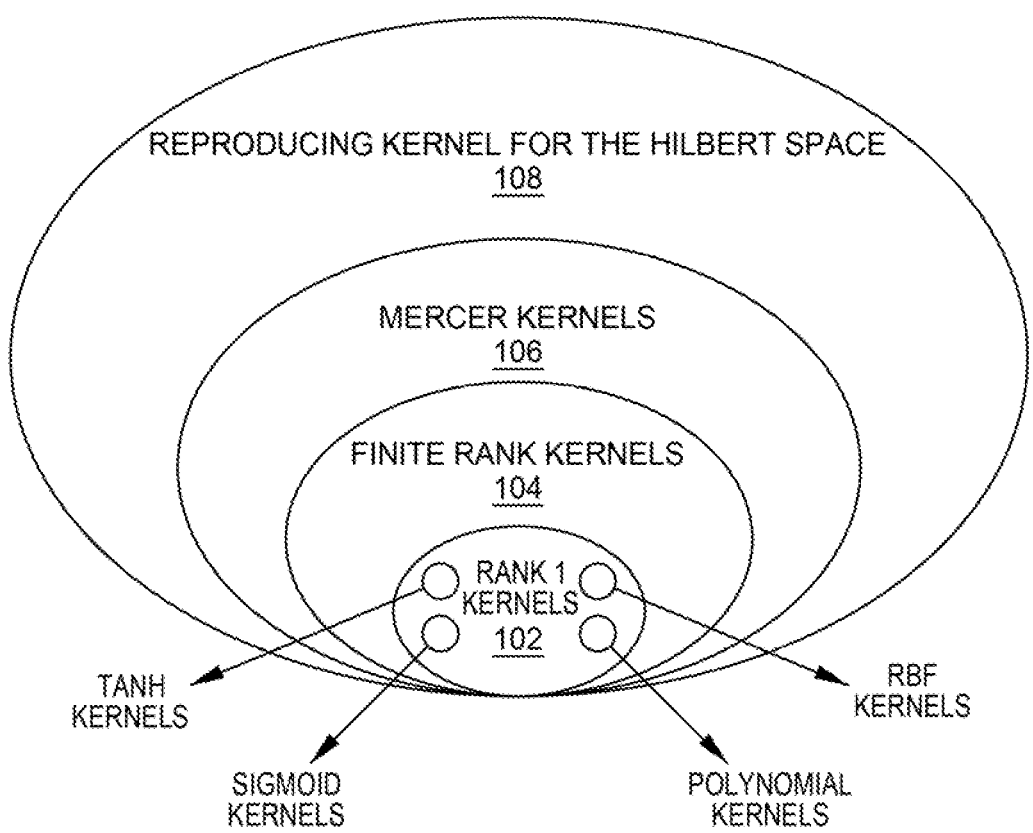
FIG. 1 depicts an example of a hierarchy of kernel spaces.

Aspects of the present disclosure provide apparatuses, methods, processing systems, and computer readable mediums for computationally efficiently forecasting values with confidence intervals, which are particularly well-suited to operate on datasets with complex geometries.

Deep kernel learning is a state-of-the-art method for forecasting with uncertainty bounds (or confidence intervals) that relies upon two underlying machine learning paradigms, namely: deep neural networks and Gaussian processes. In deep kernel learning, the deep neural network is used to learn a kernel operator of a Gaussian process, which is then successively used to forecast with uncertainty bounds.

Described herein is a modelling framework, which may be referred to a finite rank deep kernel learning, which beneficially reduces the computational complexity of deep kernel learning while enhancing deep kernel learning's ability to approximate complex functions and estimate uncertainty (or confidence). Notably, while described in the example context of deep kernel learning throughout, the framework described herein is similarly applicable to other kernel-based techniques where deep neural networks are used to learn the kernel, such as: deep kernel learning for classification and deep neural network-based support vector machines, to name a few.

One feature of finite rank deep kernel learning is a composite kernel (or "expressive" kernel), which is a linear combination of a plurality of simpler linear (or "dot") kernels. Composite kernels are capable of capturing complex geometries of a dataset, such as where certain regions of the dataset have very different structure as compared to other regions, even verging on discontinuity. Modeling this type of dataset is difficult with conventional machine learning algorithms, such as deep kernel learning, because traditional machine learning algorithms try to learn a global description of a dataset.

In finite rank deep kernel learning, each dot kernel is learned by a deep neural network. Learning simpler dot kernels, which can then be linearly combined into a composite kernel, is easier for the deep neural network to learn because an individual dot kernel represents the local geometry of the dataset rather than the global geometry, which in many cases is more complicated. Because the dot kernels are easier to learn, the overall performance of finite rank deep kernel learning is improved from a processing efficiency standpoint, and any processing device running finite rank deep kernel learning will enjoy improved performance, such as faster operation, lower processing requirements, and less memory usage, as compared to conventional machine learning methods.

Example applications of finite rank deep kernel learning include: regression with confidence bounds, forecasting time series or sequential data (long and short term), and anomaly detection, as a few examples. In regression problems based on a set of dependent variables x, the aim is to predict the value of a response variable $y \approx f(x) + \varepsilon$. In a time series forecasting problem, z(t) is either a time series or a sequence. The aim is to forecast $z(T+\tau)$ based on $\{a, b(t), z(t) | t=0, \ldots, T\}$, where a is the time series metadata and b(t) is the exogenous variable. The time series forecasting problem can be formulated as a regression problem where $x=\{a, b(t), z(t) | t=0, \ldots, T\}$ and $y=z(T+\tau)$ in the framework described herein. In both cases, the output of the model would be a probability distribution of the variable y.

Gaussian Process Overview

A Gaussian process is a stochastic process (e.g., a collection of random variables indexed by time or space) in which every finite collection of those random variables has a multivariate normal distribution. In other words, every finite linear combination of those variables is normally distributed. The distribution of a Gaussian process is the joint distribution of all those random variables, and as such, it is a distribution over functions within a continuous domain, e.g. time or space.

A machine-learning algorithm that involves a Gaussian process uses learning and a measure of the similarity between points (the kernel function) to predict the value for an unseen point from training data. The prediction is not just an estimate for that point, but also includes uncertainty information because it is a one-dimensional Gaussian distribution (which is the marginal distribution at that point).

Gaussian process is a maximum a posteriori (MAP) framework, which assumes a prior probability distribution over the function space of all possible candidate regressors, and a kernel. Thus, Gaussian process is a flexible and non-parametric framework that can forecast and quantify uncertainty simultaneously.

Generally speaking, there are two approaches to derive the theory of the Gaussian process: weight space view and function space view.

In the weight space view approach, the weights of a regression are assumed to be derived from a probability distribution, which has a Gaussian prior. A maximum a posteriori estimation is utilized to evaluate the posterior, which is then used to weigh predictions for test points for different weight configurations.

In the function space view approach, the candidate regressor functions are assumed to be sampled from a probability distribution of functions. The kernel operator models the covariance, and the posterior distribution is used to average the predictions made by individual regressors. The following outlines the equations for the function space viewpoint.

Initially, let $X=\{x_1, \ldots, x_n\}$ be the training features, where $x_i \in \mathbb{R}^d$, and $f(X):=\{f(x_1), \ldots f(x_n)\}$ is sampled from a distribution $\mathcal{N}(0, K_{X,X})$, where $K_{X,X} \in \mathbb{R}^{n \times n}$ is comprised of the value of the kernel operator evaluated at every pair of training data points. Further, let y denote the response variable corresponding to the training data points. It can be shown that:

$$f_*|X_*,X,y,\gamma,\sigma^2 \sim \mathcal{N}(E[f_*], \text{cov}[f_*]),$$

$$E[f_*]=K_{X_*,X}(K_{X,X}+\sigma^2 I)^{-1}y,$$

$$\text{cov}[f_*]=K_{X_*,X_*}-K_{X_*,X}[K_{X,X}+\sigma^2 I]^{-1}y.$$

Selection of the kernel function in Gaussian process is a non-trivial task, as depending on the geometry of the data, the right similarity or kernel function needs to be identified.

A loss function may be constructed as the log likelihood on the posterior distribution of the Gaussian process, and during the model training, the error is successively back-propagated to find the optimal embedding and the radial basis function scale parameter.

Notably, the algorithmic complexity of Gaussian process is $O(n^3)$, where n is the number of training data points. In order to reduce the computational complexity, a framework is described herein to derive the kernel with a complexity of $O(n)$ without any approximation of the kernel.

Deep Kernel Learning Overview

In the deep kernel learning framework, a deep neural network is used to learn an embedding, which is acted upon by a radial basis function (RBl) to create the kernel. A radial basis function (RBF) is a real-valued function ϕ whose value depends only on the distance from the origin, so that $\phi(x)=\phi(\|x\|)$; or alternatively on the distance from some other point c, called a center, so that $\phi(x,c)=\phi(\|x-c\|)$. Sums of radial basis functions may be used to approximate given functions. This approximation process can also be interpreted as a simple kind of neural network.

The imposition of a radial basis function kernel adds an additional structure to the kernel operator, which is a continuous operator. However, such kernels may not be adequate to represent the geometry of an arbitrary dataset, especially in cases where the dataset has widely varying local geometries (as discussed, for example, with respect to FIG. 8A). Thus, as described further herein, a composite kernel may be created instead as a linear combination of a set of simpler dot kernels. The decomposition of the kernel in this manner (i.e., using a plurality of dot kernels) ensures that each kernel captures the local geometry of a portion of the dataset and the linearly combined (composite) kernel captures the combined geometry of the whole dataset. As described further below, this may be achieved by constructing orthogonal embeddings as deep neural network outputs. This approach allows simultaneous unsupervised learning (e.g., clustering) and supervised learning (e.g., regression) in a unified framework.

Two challenges of conventional deep kernel learning are reducing computational cost without approximating the kernel function and the representation power of the kernel function. The finite rank deep kernel learning framework described herein enhances the representation power, while at the same time reducing the computational complexity. In other words, the framework described herein improves the performance of any machine upon which it is running (through reduced computation complexity) as well as improves the performance of whatever application it is supporting (through improved representation power).

Hierarchy of Kernel Operators

Let X be an arbitrary topological space, which is a feature space of a regression. Let H be the Hilbert space of the bounded real valued functions defined on X. Initially, a kernel operator K: $X \times X \to \mathbb{R}$ is called positive definite when the following is true:

$K(x,y)=K(y,x)$ $\Sigma_{i,j=1}^n c_i c_j K(x_i,x_j) \geq 0, \forall n \in \mathbb{N}, x_i, x_j \in X, c_i \in R$.

With the aid of the Riesz Representation Theorem, it can be shown that for all $x \in X$, there exists an element $K_x \in H$, such that $f(x)=\langle f, L_x \rangle$, where $\langle \cdot, \cdot \rangle$ is an inner product, with which the Hilbert Space H is endowed. Next, a reproducing kernel for the Hilbert space H (RKHS) may be defined, which constructs an operator $K(x,y)$ as an inner product of two elements $K_x$ and $K_y$ from the Hilbert space H. A reproducing kernel for the Hilbert space H may be defined as:

$K(x,y):=\langle K_x, K_y \rangle, \forall x,y \in X$.

From the definition of the reproducing kernel for the Hilbert space H, it can be observed that the reproducing kernel for the Hilbert space H satisfies the conditions of the positive definite kernel operators, as described above. Moreover, the Moore Aronszajn Theorem proves that for any symmetric positive definite kernel operator K, there exists a Hilbert space H for which it is the reproducing kernel for the Hilbert space H, or in other words, the operator satisfies $K(x,y):=\langle K_x, K_y \rangle$, where $K_x$ and $K_y$ belongs to the Hilbert space it of the real valued bounded functions on X. Notably, $K_x$ and $K_y$ can be discontinuous.

It also can be noted that the space of the reproducing kernel for the Hilbert space H may be very rich in terms of the complexity, and no a priori assumption need be made on the smoothness of the operator. An example of a reproducing kernel for the Hilbert space H, which is non-smooth is as follows:

$\delta(x, y) = 1$, if $x = y$, $= 0$, otherwise

Thus, $K=\delta$ is a symmetric and positive definite kernel, but is non-smooth.

Next, a subclass of the reproducing kernel for the Hilbert space H may be considered, which is continuous in addition to being symmetric and positive definite. Such kernels are called Mercer kernels. Mercer's Decomposition Theorem provides a decomposition of such an arbitrary kernel into the Eigen functions, which are continuous themselves. For example, for any continuous reproducing kernel for the Hilbert space $K(x,y)$, the following condition is satisfied:

$$\lim_{R \to \infty} \sup_{x,y} \left| K(x, y) - \sum_{i=1}^R \zeta_i \phi_i(x) \phi_i(y) \right| = 0,$$

where $\phi_i \in \mathbb{C}^0$ forms a set of orthonormal bases, and $\zeta_i \in \mathbb{R}^+$ are the $i^{th}$ Eigen function and Eigen value of the integral operator $T_K(\bullet)$, corresponding to the kernel K. It also can be shown with the aid of the spectral theorem that the Eigen values asymptotically converge to 0.

Kernel operators may be thought of as similarity functions that capture relationships between points in a dataset. FIG. 1 depicts an example of a hierarchy of kernel spaces, including rank 1 kernels 102, finite rank kernels 104, Mercer kernels 106, and reproducing kernels for the Hilbert space 108.

Kernel functions used in existing deep kernel learning methods are primarily radial basis function kernels and polynomial kernels and consequently form a small set of possible kernel functions to represent a potentially rich and complex dataset. These kernels are primarily rank 1 (e.g., 102), which constitute a smaller subspace of possible kernels as depicted in FIG. 1.

By contrast, finite rank deep kernel learning expresses a composite kernel as sum of multiple simpler dot kernels, which cover the space of finite rank Mercer kernels 104, as depicted in FIG. 1. The composite kernels may be expressed as follows:

$K(x,y)=\Sigma_{i=1}^R \phi_i(x) \phi_i(y)$, where $\phi_i(x)$'s form a set of orthogonal embeddings, which are learnt by a deep neural network. By expressing the composite kernel in this fashion, one can show that the possible set of kernels would become richer than the existing kernels adopted in conventional deep kernel learning approaches.

As depicted in FIG. 1, Mercer kernels 106 form a smaller subspace of the reproducing kernels for the Hilbert space 108, as Mercer kernels are generally continuous. For instance, the kernel $\delta(x,y)$, which is a reproducing kernel for the Hilbert space, but is not continuous, cannot be decomposed according to the Mercer's Decomposition Theorem. But a rich subset of kernels can be represented by Mercer kernels, which can be expressed as follows:

$K(x,y) \sim \Sigma_{i=1}^R \zeta_i \phi_i(x) \phi_i(y)$, where $\phi_i$ forms an orthonormal basis. The orthonormality of the basis ensures an inverse of the operator can be constructed as follows:

$$\sum_{i=1}^{R}\frac{1}{\zeta_i}\phi_i(x)\phi_i(y),$$

which reduces computation of the inverse operator. Further, the Mercer kernels 106 can have countable ranks with diminishing Eigen values. So, while Mercer kernels 106 are a less rich set as compared to the reproducing kernels for the Hilbert space 108, they nevertheless form a diverse subspace of the reproducing kernels for the Hilbert space 108.

Notably, a Mercer kernel generally has countable rank i.e. any Mercer kernel can be expressed as sum of countable rank 1 kernels. For example, $\phi_i(x)\phi_i(y)$ is a rank 1 kernel. Generally, a Mercer kernel $K(x,y)$ is of finite rank R if it can be expressed as follows:

$$K(x,y)=\Sigma_{i=1}^{R}\zeta_i\phi_i(x)\phi_i(y).$$

In some cases, kernels used in machine learning are rank 1 Mercer kernels, which have $\sigma_1=1$, and $\sigma_i=0$ for $i\geq 2$. For example, popular kernels used in machine learning, such as a polynomial kernel $(k(x,y)=(x'y+c)^d)$ and a Radial Basis Function kernel $$\left(k(x,y)=\exp\left(-\frac{\|x-y\|^2}{\sigma^2}\right)\right),$$

are rank 1 Mercer kernels. Generally, any rank 1 Mercer kernel may be expressed as $K(x,y)=\langle c(x),c(y)\rangle$ for some continuous function c.

As above, Mercer kernels 106 form a subspace of the reproducing kernels for the Hilbert space 108. Similarly, rank 1 Mercer kernels 102 form a smaller subspace of the Mercer kernels 106, as depicted in FIG. 1.

Finite Rank Deep Kernel Learning

It is desirable to create a set of kernels that have greater representational power. One method is to use a finite rank Mercer kernel to represent a richer class of kernels, which may be represented as follows:

$$K(x,y)=\Sigma_{i=1}^{R}\phi_i(x,\omega)\phi_i(y,\omega)$$

This kernel selection technique is useful when using deep neural networks to learn the embeddings $\phi_i$, especially where a dataset has widely differing local geometries, because the deep neural network could decompose the embeddings $\phi_i$ into orthogonal embeddings.

Notably, any arbitrary finite rank Mercer kernel can be approximated by a deep neural network. Thus, for any Mercer kernel:

$$K(x,y)=\Sigma_{i=1}^{R}\zeta_i\phi_i(x,\omega)\phi_i(Y,\omega),$$

and an $\varepsilon>0$, there exists an N and a family of neural network regressors with finite number of hidden units and output layer $\phi_i(z,w)$ such that:

$$\left|K(x,y)-\sum_{i=1}^{R}\phi_i(x,\omega)\phi_i(y,\omega)\right|\langle\varepsilon,\forall R\rangle N, \text{ and } \forall x,y\in X,$$

where $\phi_i(z,\omega)$ forms a set of orthogonal functions based on weights $\omega$. Accordingly, an arbitrary smooth Mercer kernel can be modeled by a multi-layer neural network with outputs $\phi_i(z,\omega)$. The outputs of the neural network may form embeddings that are orthogonal to one another. As a consequence of the orthogonality, the inverse operator can also be expressed in terms of the deep neural network output layer.

Generation of Orthogonal Embeddings

The Gaussian process kernel may be modeled as follows:

$$K(x,y)=\Sigma_{i=1}^{R}\phi_i(x,\omega)\phi_i(y,\omega),$$

where $\phi_i(y,w)$ would be ideally orthogonal to one another. The deep kernel learning algorithm optimizes the negative log likelihood function, based on the kernel operator, which may be represented as follows:

$$-\log p(y|x) \sim y^T(K_\gamma+\sigma^2 I)^{-1}y+\log|K_\gamma+\sigma^2 I|$$

A penalty term to the cost may be introduced, as follows:

$$-\log p(y|x)+\lambda\sum_{i,j,i\neq j}\left(\phi_i(x,w)^T\phi_j(x,w)\right)^2$$

where, $\lambda$ is a weight assigned to the orthogonality objective as opposed to the log likelihood. Notably, $\Sigma_{i,j,i\neq j}(\phi_i(x,\omega)^T\phi_j(x,\omega))^2$ is minimized when the embeddings are orthogonal.

Below it will be shown further that the inversion of the matrix $(K_\gamma+\sigma^2 I)^{-1}$, and the determinant computation $|K_\gamma+\sigma^2 I|$ can be further simplified, and as a consequence the optimization can be done in batches.

Computational Complexity Reduction of Finite Rank Deep Kernel Learning During Training The main computational bottleneck in deep kernel learning concerns the inversion of the kernel operator, which as above has computational complexity $O(n^3)$. As shown below, methods described herein can reduce the computational complexity of calculating a loss function, such as negative log-likelihood, to $O(n)$, which gives substantial performance improvements when training models.

The optimizations discussed herein are based on the following lemmas. First, according to the Sherman-Morrison formula, suppose $A\in\mathbb{R}^{n\times n}$ and $u,v\in\mathbb{R}^n$ are column vectors, then $A+uv^T$ is invertible if and only if $1+v^TA^{-1}u\neq 0$, which in this case gives the following:

$$(A+uv^T)^{-1}=A^{-1}-\frac{A^{-1}uv^TA^{-1}}{1+v^TA^{-1}u} \quad\text{(Lemma 1)}$$

Second, according to a matrix determinant lemma, suppose A is an invertible square matrix and u, v are column vectors, then the matrix determinant lemma states that:

$$\det(A+uv^T)=(1+v^TA^{-1}u)\det(A) \quad\text{(lemma 2)}$$

Thus, as above, a finite rank kernel with orthogonal basis functions may be defined as:

$$K(X, Y) = \sum_{i=1}^{R} \phi_i(X)\phi_i(Y)$$

$$X \to \{\phi_i(X); i = (1, \ldots, R)\}$$

The negative log-likelihood, which conventionally requires computationally costly matrix inversions, can then be reformulated in part using Lemma 1 as follows:

$$y^T(K_{X,X} + \sigma^2 I)^{-1} y =$$

$$y^T \left[ \sum_{i=1}^{R} \phi_i(X)\phi_i(X)^T + \sigma^2 I \right] y = y^T \left[ \prod_{i=1}^{R} \sigma^{-\frac{2(R-1)}{R}} \phi_i(X)\phi_i(X)^T + \sigma^{\frac{2}{R}} I \right]^{-1} y =$$

$$y^T \left[ \sigma^{-2} I - \sum_{i=1}^{R} \frac{1}{\sigma^2(\sigma^2 + \|\phi_i(X)\|_2^2)} \phi_i(X)\phi_i(X)^T \right] y =$$

$$\sigma^{-2} \|y\|_2^2 - \sum_{i=1}^{R} \frac{\langle \phi_i(X), y \rangle^2}{\sigma^2(\sigma^2 + \|\phi_i(X)\|_2^2)}$$

Thus, there is no inversion necessary for this part of the negative log-likelihood calculation. Further, Lemma 2 can be used as follows:

$$\log \det(K_{X,X} + \sigma^2 I) = \log \det \left[ \prod_{i=1}^{R} \sigma^{-\frac{2(R-1)}{R}} \phi_i(X)\phi_i(X)^T + \sigma^{\frac{2}{R}} I \right] =$$

$$\sum_{i=1}^{R} \log \det \left( \sigma^{-\frac{2(R-1)}{R}} \phi_i(X)\phi_i(X)^T + \sigma^{\frac{2}{R}} I \right) =$$

$$\sum_{i=1}^{R} \log(\sigma^2 + \|\phi_i(X)\|_2^2) + (N-R)\log\sigma^2$$

From these two formulations, the resulting equation for negative log-likelihood is shown below and is order $O(n)$ because there are no matrix inversion necessary:

$$-\log P(y|X) \propto$$

$$\sigma^{-2}\|y\|_2^2 - \sum_{i=1}^{R} \frac{\langle\phi_i(X), y\rangle^2}{\sigma^2(\sigma^2 + \|\phi_i(X)\|_2^2)} + \sum_{i=1}^{R} \log(\sigma^2 + \|\phi_i(X)\|_2^2) + (N-R)\log\sigma^2$$

Thus, training a model using these formulations is significantly more efficient than with conventional methods that require matrix inversion.

Based on the above formulations, total loss may be decomposed into the following loss components:

$$\text{data fit loss} = \sigma^{-2}\|y\|_2^2 - \sum_{i=1}^{R} \frac{\langle\phi_i(X), y\rangle^2}{\sigma^2(\sigma^2 + \|\phi_i(X)\|_2^2)}$$

$$\text{complexity loss} = \sum_{i=1}^{R} \log(\sigma^2 + \|\phi_i(X)\|_2^2) + (N-R)\log\sigma^2$$

$$\text{regularity loss} = \lambda\sigma^{-2}\|y\|_2^2 \sum_{i<j} \frac{\langle\phi_i(X), \phi_j(X)\rangle^2}{\|\phi_i(X)\|_2^2 \|\phi_j(X)\|_2^2}$$

Thus, in this example, total loss=data fit loss+complexity loss+regularity loss.

Computational Complexity Reduction of Finite Rank Deep Kernel Learning During Inferencing Inferencing with a finite rank deep kernel learning model may also be optimized to O(n), which provides the same significant improvement when such a model is being used, for example by an application, such as described in more detail below.

First, the mean value of predictions E[y*] may be calculated as follows:

$$E[y^*] = K_{X^*,X}(K_{X,X} + \sigma^2 I)^{-1} y = \sum_{i=1}^{R} \frac{\langle\phi_i(X), y\rangle}{\sigma^2 + \|\phi_i(X)\|_2^2} \phi_i(X^*)$$

Thus, the computational cost of the expectation is linear with respect to the size of the training or testing dataset, specifically O((N+N*)R).

Second, the uncertainty bounds of the predictions cov [y*] may be calculated as follows:

$$\text{cov}[y^*] = K_{X^*,X^*} - K_{X^*,X}(K_{X,X} + \sigma^2 I)^{-1} K_{X,X^*} =$$

$$\sum_{i=1}^{R} \phi_i(X^*)\phi_i(X^*)^T - \left(\sum_{i=1}^{R} \phi_i(X^*)\phi_i(X)^T\right) \cdot \left[$$

$$\sigma^{-2} I - \sum_{i=1}^{R} \frac{1}{\sigma^2(\sigma^2 + \|\phi_i(X)\|_2^2)} \phi_i(X)\phi_i(X)^T \right] \left[\sum_{i=1}^{R} \phi_i(X)\phi_i(X^*)^T\right] =$$

$$\sum_{i=1}^{R} \phi_i(X^*)\phi_i(X^*)^T - \sum_{i=1}^{R} \left(\frac{\|\phi_i(X)\|_2^2}{\sigma^2} - \frac{\|\phi_i(X)\|_2^4}{\sigma^2(\sigma^2 + \|\phi_i(X)\|_2^2)}\right) \phi_i(X^*)\phi_i(X^*)^T =$$

$$\sum_{i=1}^{R} \frac{\sigma^2}{\sigma^2 + \|\phi_i(X)\|_2^2} \phi_i(X^*)\phi_i(X^*)^T$$

Here again, the computational cost of the uncertainty bounds are also linear with respect to the size of the training or testing dataset, specifically O((N+N*)R).

Factorization of Likelihood to Further improve Model Training Runtime Performance Further improvements to model training performance are possible by factorizing the global loss into a plurality of smaller, local losses, for example, using a log-likelihood calculation during training.

To illustrate this improvement, assume an example in which a target company's cash flows are to be forecasted based on a predictive model, such as further described in an example below with respect to FIGS. 6 and 7B. For purposes of training the predictive model, assume that there are N total companies and that $y_i$ is a prediction for the ith company based on $X_i$ input data associated with the ith company. Further, assume each of the N companies has at least M data points. Notably, in this cash flow prediction example, an individual data point may represent the sum of a day's transactions, or a week's transactions, or a month's transactions, which in-turn relate to a daily, weekly, or monthly cash flow. In some examples, courser data may beneficially result in a smoother output function. In this example, then, the overall runtime would be approximately O(N*M) given the formulations discussed above and without factorization.

Now further assume that future forecasts $y_i$ associated with the target company are conditionally independent of other companies' forecasts given the target company's historical data. Then, the negative log-likelihood derived above for purposes of a training loss function may be factorized as:

$$-\log P(y|X) = \Sigma_{i=1}^{N} -\log P(y_i|X_i),$$

In other words, the individual negative log-likelihoods for each individual company may be calculated separately during training and then summed for the overall loss. This factorization allows the training algorithm to run faster, which results in faster convergence, and improved computation efficiency. Further, the processing systems may run more efficiently due to reduced memory use when calculating loss based on factorized input data, which may allow training to take place on lower-powered processing systems and even mobile devices.

In some cases, then, the overall loss function may be based on N-company specific training epochs, which may each include K training loops, where K≥1.

Further, factorization allows for learning patterns across all of the N companies based on their representations, $\phi_i$. For example, representations for different companies may be clustered using unsupervised learning algorithms to determine underlying groupings and patterns.

Further yet, factorization enables stochastic gradient descent to be used despite the Gaussian process aspect of finite rank deep kernel learning models and further improves the performance of stochastic gradient decent. In this context, gradient descent is an optimization algorithm usable with machine learning algorithms to find the values of parameters (coefficients) of a function $f$ that minimizes a cost function, such as the optimized negative log-likelihood cost function described above. In particular, factorization allows for performing stochastic gradient descent with batch size b=the size of the target company's data M, i.e., b=M. Because gradient descent can be slow to run on very large datasets, reducing the batch size from b=NM without factorization to b=M with factorization significantly improves performance of gradient descent to O(b).

In some cases, the amount of data M available for different companies in the set of N companies may be different. For example, assume M is the number of months of cash flow data points for a given company. A first company may have $M_1$=500 months of data, while a second company may have $M_2$=600 months of data. In such cases, the date for all M companies may be truncated to an amount of data (e.g., a number of data points) that all companies have so that batch size is consistent for stochastic gradient decent. In such an example, i.e., where M is set to 500, then only 500 data points for the first and second companies would be considered during model training.

Alternatively, a subset of the N total companies with at least M data points may be modeled. In such an example, a new (or newer) company with fewer than M data points may not be included in the training data when building the predictive model.

Notably, cash flow prediction is just one example for the methods described herein, and factorization may be applied to many other prediction contexts.

Example Finite Rank Deep Kernel Learning Flow

Figure 2:
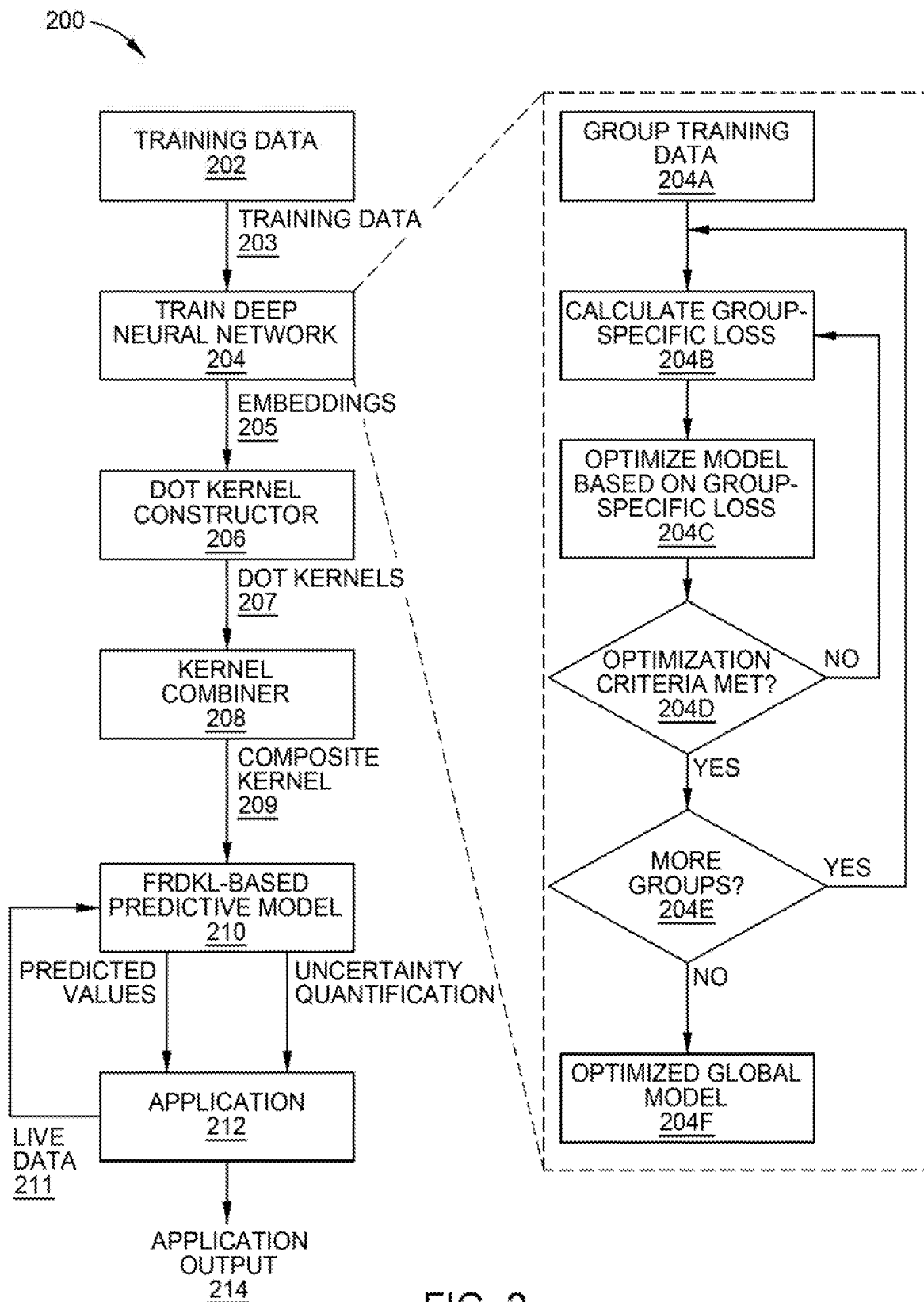
FIG. 2 depicts an example of a finite rank deep kernel learning flow.

FIG. 2 depicts a finite rank deep kernel learning flow 200. Flow 200 begins at step 202 with acquiring training data. In some cases, as described above, the training data may form a complex geometry.

Flow 200 then proceeds to step 204 where the training data 203 is used to train a deep neural network.

In some embodiments, training a deep neural network model at step 204 includes factorization of the loss function, as described above. For example, training may begin at step 204A with grouping training data $X_i$ based on a characteristic. The characteristic may be any sort of characteristic that divides the training data into a fixed number of groups, such as grouping training data by individual companies. In such an example, $X_1$ would be training data for company 1, $X_2$ would be training data for company 2, and so on.

Next, at step 204B, a group-specific loss is calculated at based on the group of training data. In other words, $-\log P(y_i|X_i)$ is calculated for an ith group.

Next, at step 204C, a model is optimized based on the loss for a specific group, such as the ith group. In one example, a gradient descent method is used, such as stochastic gradient descent.

Next at step 204D, one or more optimization criteria are determined and compared against one or more respective thresholds. For example, the criteria may involve the number of training iterations, the percentage reduction in loss, the overall loss, and others.

If at step 204D the one or more criteria are not met, then the flow returns to step 204B for another training iteration. If at step 204D the one or more criteria are met, then the flow proceeds to step 204E where it is determined if there are any more groups for training. If there are more groups of training data to be processed, the flow returns to step 204B with a new set of training data for a new group. If there are no more groups of training data, then the flow moves to 204F with an optimized global model, which is a deep neural network model in this example.

Notably, in this example, the flow of steps 204B-204E is depicted in a sequential fashion, i.e., sequential for each group of training data. However, in other examples, these optimization steps (e.g., including stochastic gradient descent) are performed in parallel. For example, a plurality of processors or processing systems may each process a subset of groups of training data, and after the optimization steps, a master routine combines the gradients from all the parallel executions. This is referred to as consensus-based optimization.

Figure 3:
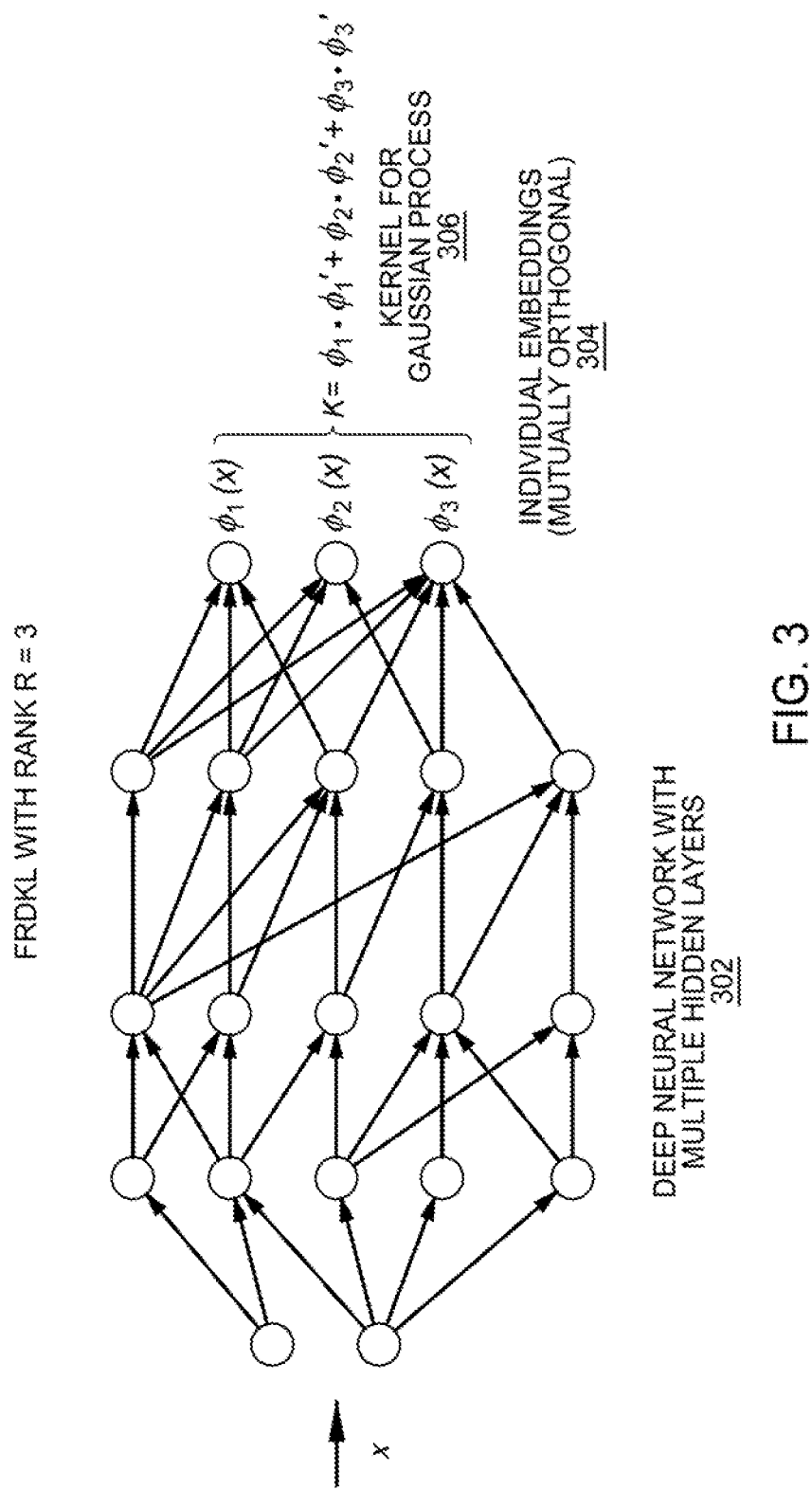
FIG. 3 depicts an example of using a deep neural network to create embeddings for a composite kernel.

Returning to the primary flow, the outputs of the deep neural network trained at step 204 are embeddings 205. As described above, by changing the loss function to emphasize orthogonality of the embeddings, the resulting embeddings may be approximately orthogonal. FIG. 3, described below, depicts an example of using a deep neural network to construct embeddings.

Flow 200 then proceeds to step 206 where a plurality of dot kernels 207 are constructed from the approximately orthogonal embeddings. As described above, each of the dot kernels may be a finite rank Mercer kernel. FIG. 3, described below, depicts an example of forming a dot kernel from embeddings produced by a deep neural network.

Flow 200 then proceeds to step 208 where the plurality of dot kernels are linearly combined into a composite (i.e., expressive) kernel 209.

Flow 200 then proceeds to step 210 where the composite kernel is used as the basis of a finite rank deep kernel learning predictive model. For example, the predictive model may act on live data 211 to create predictions for application 212. Notably, in this example, predictive model 210 has two outputs: (1) predicted values, which are mean values based on the predictions from each dot kernel; and (2) confidences associated with the predicted values.

Flow 200 concludes at step 214 where an application 212, such as computer vision, time series forecasting, natural language processing, classification, and regression, or those described in more detail below, uses the outputs of the predictive model 210 to provide an application-specific output 214.

Example of Using Deep Neural Network to Create Embeddings for a Composite Kernel FIG. 3 depicts an example of using a deep neural network to create embeddings for a composite kernel for finite rank deep kernel learning. As depicted in FIG. 3, a deep neural network with multiple hidden layers 302 learns a plurality of embeddings 304, which in this example include $\phi_1(x)$, $\phi_2(x)$, and $\phi_3(x)$. The plurality of embeddings are used to form the kernel for the Gaussian process 306, which in this example is rank 3. In this example, the deep neural network produces vector output, each entry of which forms an individual embedding.

Figure 4:
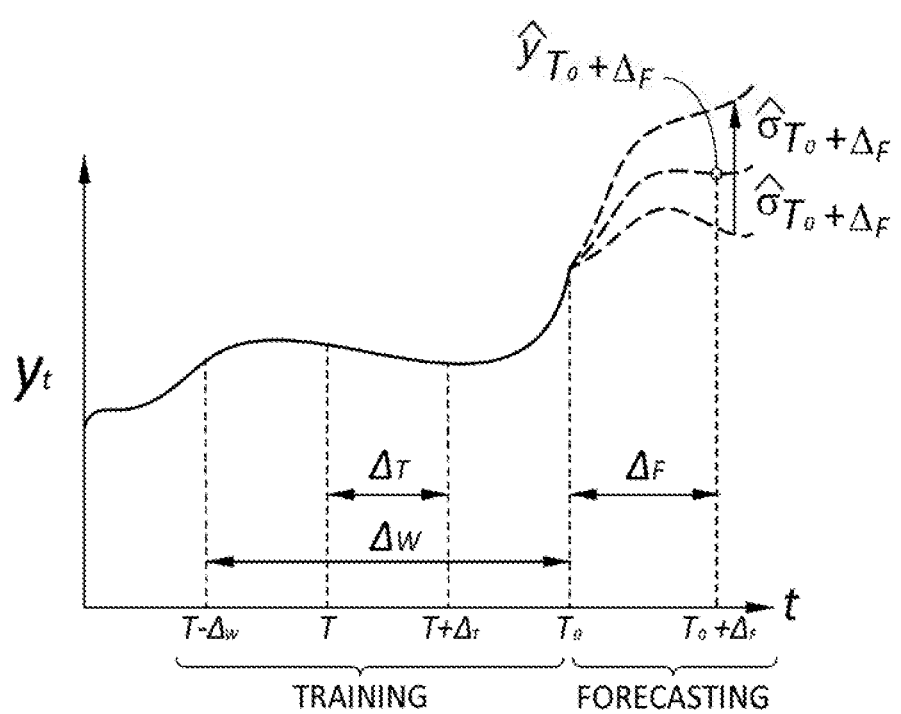
FIG. 4 depicts an example of converting a forecasting problem into a regression problem for improved forecasting performance.

Converting a Forecasting Problem into a Regression Problem to Improve Forecasting Performance FIG. 4 depicts an example of converting a forecasting problem into a regression problem for improved forecasting performance.

One conventional method for forecasting some number $\Delta$ of steps (e.g., time units, such as days, weeks, months, years, etc.) ahead is to feed one step ahead model output back into the model $\Delta$ times. However, doing so carries forward and compounds the error at each step, which quickly leads to the forecast uncertainty becoming unreasonably large.

Another conventional method for forecasting varying numbers of steps ahead is to build a model for each number of different steps, thus building multiple models, each with a specific forecasting period. However, such methods are costly in terms of time and resource utilization due to the need for building an arbitrary number of models.

A method that improves upon the uncertainty problem and resource utilization problem of the aforementioned conventional methods is to build a single model wherein $\Delta$ is an input variable. In other words, the training data can be constructed such that an exact time dependence between the input and output is known (e.g., labeled). For example, a training dataset may be constructed as follows:

$$\{T, \Delta_T, y_{T-W}, y_{T-W+1}, \ldots, y_T\} \rightarrow \{y_{T+\Delta_T}\},$$

where W is the look back window, $\Delta_T$ is the step unit, T is the current position or time, and $y_{T+\Delta_T}$ is the target variable. This formulation allows a model to explicitly learn the time relationships in the input data. For example, training data prepared in this manner may be used as training data 202 in flow 200, described above with respect to FIG. 2.

Thus, given a trained model M, such as a trained finite rank deep kernel learning model (as described above), the following can be determined:

$$\{\hat{y}_{T+\Delta_F}, \hat{\sigma}_{T+\Delta_F}\} = \Sigma_{\tau=0}^n M(\tau, \Delta_F, y_{\tau-W}, \ldots, y_\tau),$$

where $\hat{y}_{T+\Delta_F}$ is the mean prediction (forecast) at a time $\Delta_F$ steps in the future, and $\hat{\sigma}_{T+\Delta_F}$ is the uncertainty (standard deviation in this example) of the mean prediction.

Figure 6:
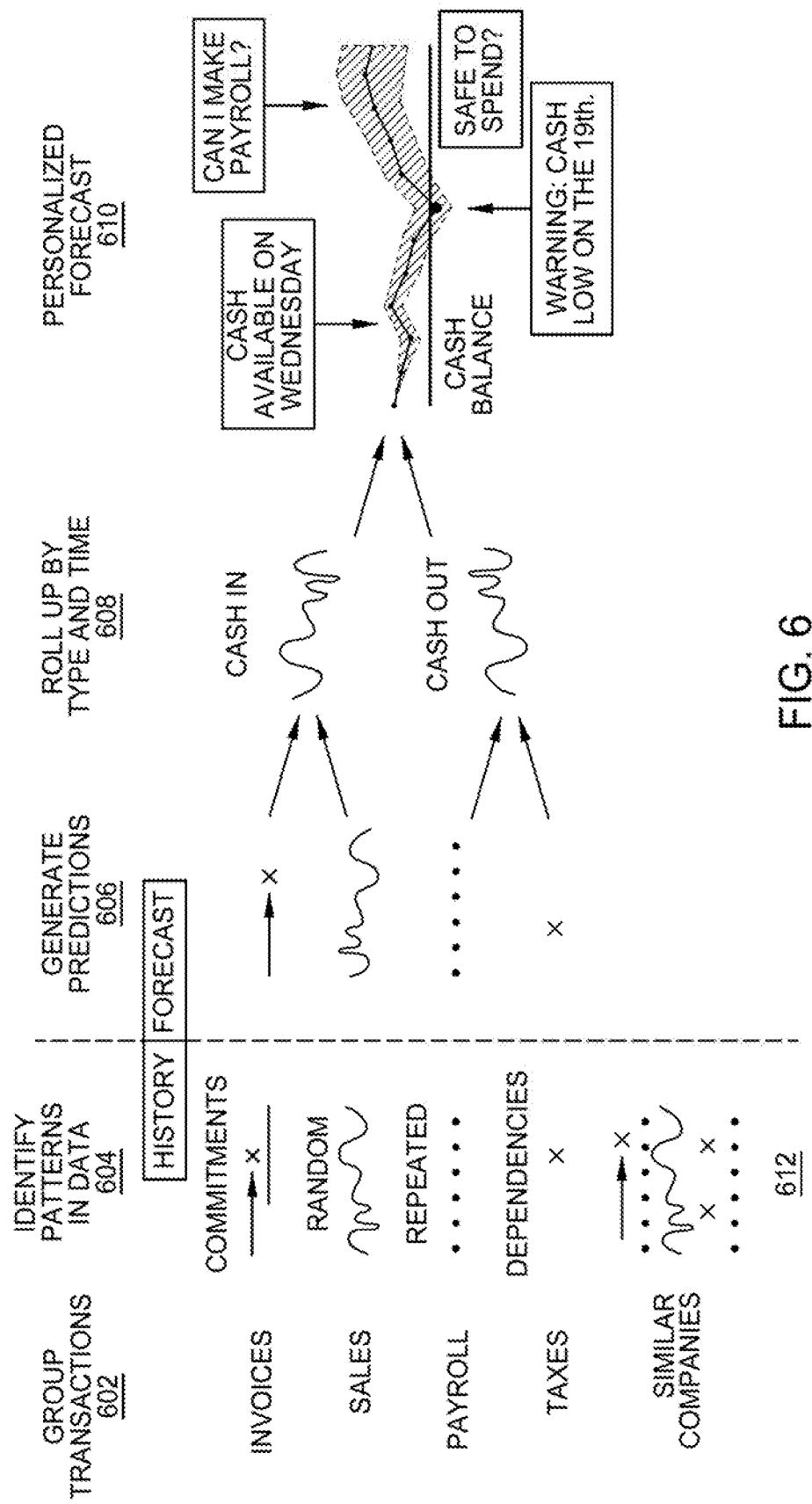
FIG. 6 depict an example application context for finite rank deep kernel learning.

One example where this formulation may be particularly useful is when modeling for different underlying patterns in data, such as shown in one example in FIG. 6. For example, rather than modeling tax payments in a monthly cash flow forecast conventionally, which would cause the tax payments to affect all month's predicted cash flow even though the taxes may only be due in certain months (e.g., quarterly taxes), the formulation above accounts for this time-dependency and thus would concentrate the predicted effects of the taxes in the months in which tax payments actually affected cash flows.

Figure 5:
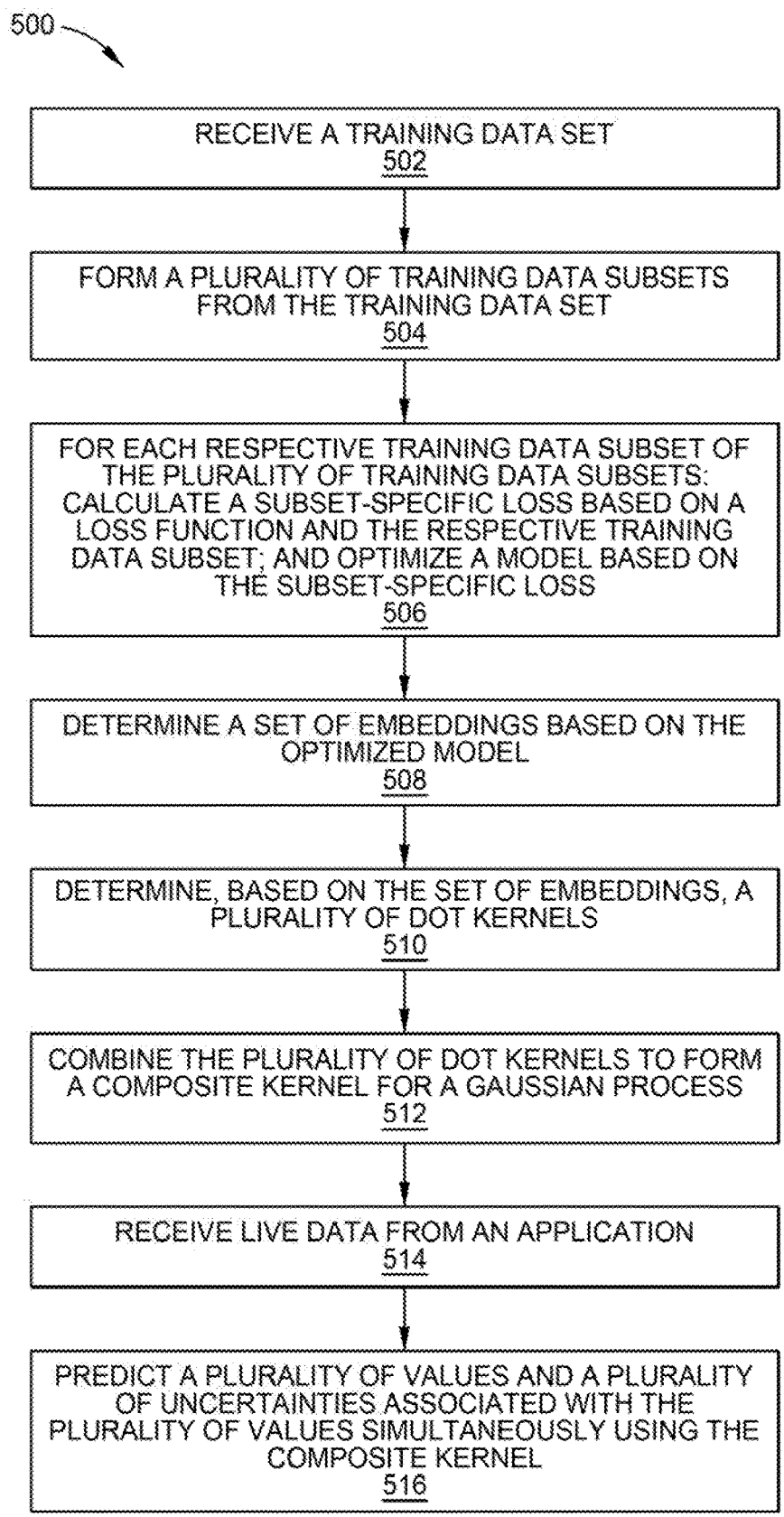
FIG. 5 depicts an example of a finite rank deep kernel learning method.

Example Method for Creating and Using Finite Rank Deep Kernel Learning Models FIG. 5 depicts a finite rank deep kernel learning method 500.

Method 500 begins at step 502 with receiving a training dataset. As described above, in some embodiments the training dataset may comprise training data with complex geometries, such as datasets including multiple discontinuous portions. In some embodiments, each training data instance in the training data subset comprises a step unit feature, a current time feature, a plurality of past observation features, and a target observation feature based on the step unit feature.

Method 500 then proceeds to step 502 with forming a plurality of training data subsets from the training dataset. For example, as described above, each training data subset may be based on a common characteristic of the data within the data subset, such as a same company.

Method 500 then proceeds to step 506 with calculating a subset-specific loss based on a loss function and the respective training data subset, and optimizing a model based on the subset-specific loss for each respective training data subset of the plurality of training data subsets. In some embodiments, the model may be a neural network model. In some embodiments, optimizing the model comprises minimizing a loss function. In some embodiments, the loss function comprises: one or more of:

$$\text{a data fit loss component} = \sigma^{-2}\|y\|_2^2 - \sum_{i=1}^R \frac{\langle\phi_i(X), y\rangle^2}{\sigma^2(\sigma^2 + \|\phi_i(X)\|_2^2)};$$

$$\text{a complexity component} = \sum_{i=1}^R \log(\sigma^2 + \|\phi_i(X)\|_2^2) + (N-R)\log\sigma^2;$$

$$\text{or a regularity loss component} = \lambda\sigma^{-2}\|y\|_2^2 \sum_{i<j} \frac{\langle\phi_i(X), \phi_j(X)\rangle^2}{\|\phi_i(X)\|_2^2 \|\phi_j(X)\|_2^2}.$$

Method 500 then proceeds to step 508 with determining a set of embeddings based on the optimized model.

Method 500 then proceeds to step 510 with determining, based on the set of embeddings, a plurality of dot kernels. In some embodiments, $\Sigma_{i,j,i\neq j}(\phi_i(x,\omega)^T \phi_j(x,\omega))^2$ is minimized as a cost function to maintain an orthogonality of the set of embeddings when forming the set of embeddings.

In some embodiments, the orthogonality of the set of embeddings is optimized based on a cost function, wherein the cost function includes a penalty term $\lambda$ associated with orthogonality of the set of embeddings. In some embodiments, the cost function may be implemented as: $-\log p(y|x) + \lambda \Sigma_{i,j,i\neq j}(\phi_i(x,\omega)^T \phi_j(x,\omega))^2$.

Method 500 then proceeds to step 512 with combining the plurality of dot kernels to form a composite kernel. In one embodiment, the composite Kernel for the Gaussian process is modeled as a linear combination of the plurality of dot kernels as: $K(x,y)=\sum_{i=1}^{R} \phi_i(x,\omega)\phi_i(y,\omega)$. In some embodiments, the composite kernel for the Gaussian process is a finite rank Mercer kernel.

Method 500 then proceeds to step 514 with receiving live data from an application. In this example, live data is distinguished from training data in that it is data the model has not yet seen. In one embodiment, the live data comprises financial data. In another embodiment, the live data comprises resource utilization data. In yet another embodiment, the live data is user activity data (e.g., user log data captured on systems used by users or accessed by users).

Method 500 then proceeds to step 516 with predicting a plurality of values and a plurality of uncertainties associated with the plurality of values simultaneously using the composite kernel.

In some embodiments, predicting the plurality of values comprises determining a mean value of each prediction E[y*] of the plurality of predictions according to:

$$\sum_{i=1}^{R} \frac{\langle \phi_i(X), y \rangle}{\sigma^2 + \|\phi_i(X)\|_2^2} \phi_i(X^*).$$

In some embodiments, wherein predicting the plurality of uncertainties comprises: determining a covariance of each prediction (cov [y*]) of the plurality according to:

$$\sum_{i=1}^{R} \frac{\sigma^2}{\sigma^2 + \|\phi_i(X)\|_2^2} \phi_i(X^*)\phi_i(X^*)^T;$$

and determining a variance of each prediction y* a diagonal of the of cov [y*].

In some embodiments, each prediction of the plurality of predictions is determined according to $\{\hat{y}_{T+\Delta_F}, \sigma_{T+\Delta_F}\}=\sum_{\tau=0}^{n} M(\tau, \Delta_F y_{\tau-W}, \ldots, y_\tau)$, where $\hat{y}_{T+\Delta_F}$ is a mean prediction at a time $\Delta_F$ steps in the future, and $\sigma_{T+\Delta_F}$ is the uncertainty of the mean prediction.

In one embodiment, the application is a financial management application, the plurality of values comprises a plurality of predicted future financial transactions, and each uncertainty of the plurality of uncertainties associated with a respective predicted future financial transaction estimates a range of values of the respective predicted future transaction.

In another embodiment, the application is a resource management application, the plurality of values comprises a plurality of predicted resources needs, and each uncertainty of the plurality of uncertainties associated with a respective predicted future resource need estimates a range of values of the respective resource need.

In yet another embodiment, the application is a resource access control application, the plurality of values comprises a plurality of predicted user activities, and each uncertainty of the plurality of uncertainties associated with a respective predicted future user activity estimates a range of values of the respective user activity.

Notably, FIG. 5 is just one embodiment, and other methods including differ aspects are described herein.

Example Application Context for Finite Rank Deep Kernel Learning

FIG. 6 depicts an example application context for finite rank deep kernel learning, which includes several analytical steps. In this particular example, the context is personalized cash flow forecasting.

In this example, personalized cash flow forecasting begins with collecting and grouping transaction data at 602, such as invoices, sales, payroll, taxes, and others. In some cases, each of these types of transactions may be analyzed at 604 to determine patterns in the data.

The transaction data may then be used for finite rank deep kernel learning in order to build a finite rank deep kernel learning model, such as described above (e.g., with respect to FIG. 2).

The model (not shown) may then generate predictions. In some cases, such as shown in this example, the model may predict different sorts of transactions with different kernels of a composite kernel, which may account for different behavior of different transaction types. The model (or models) may be used to predict, for example, cash in and cash out, as shown at 608. These may then be combined to predict a personalized cash flow as shown at 610.

Example Application Output of Finite Rank Deep Kernel Learning Model

Finite rank deep kernel learning is broadly applicable to any application where forecasting or prediction with uncertainty estimation (e.g., confidence intervals) is desirable. In particular, finite rank deep kernel learning may improve application and processing system performance where the underlying dataset is large and complex (e.g., in terms of geometry).

A first example: application is cash flow forecasting e.g., for providing financial services. For example, a financial services organization may seek to provide cash flow forecasting services to users of a financial planning application. Because cash flow, when considered as a time series dataset, tends to be complex and discontinuous, finite rank deep kernel learning (as described herein) is a desirable methodology. Moreover, because the organization offering the financial services may have many customers with much data that can be aggregated, finite rank deep kernel learning may significantly improve the performance of the financial planning application in terms of accuracy of cash flow forecasts, confidence in cash flow forecasts, speed of generating the forecasts, and efficiency of computing resources used to produce the forecasts and uncertainty estimations (e.g., confidence intervals).

Figure 7A:
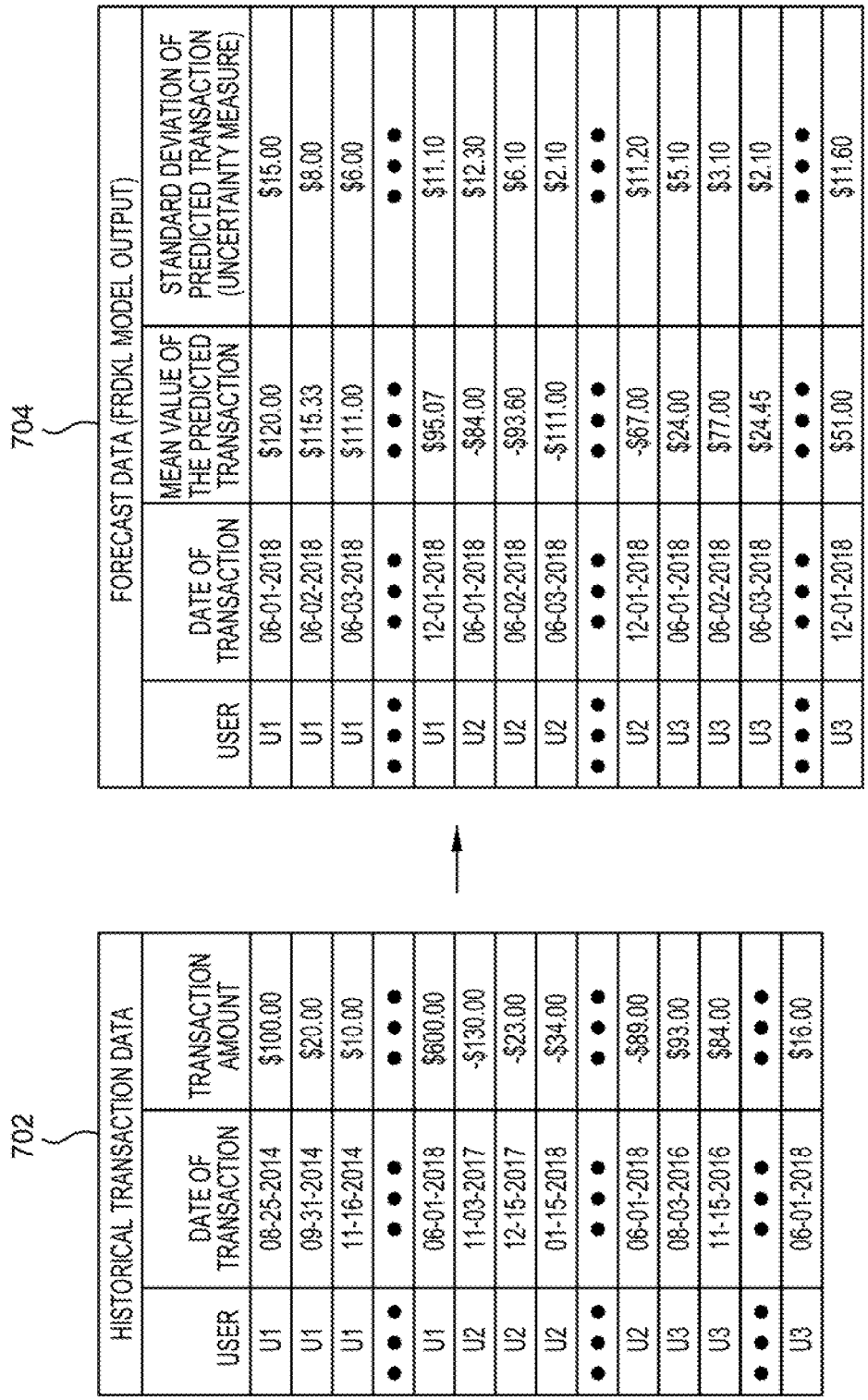
FIGS. 7A and 7B depict example application input and output based on a finite rank deep kernel learning model.
Figure 7B:
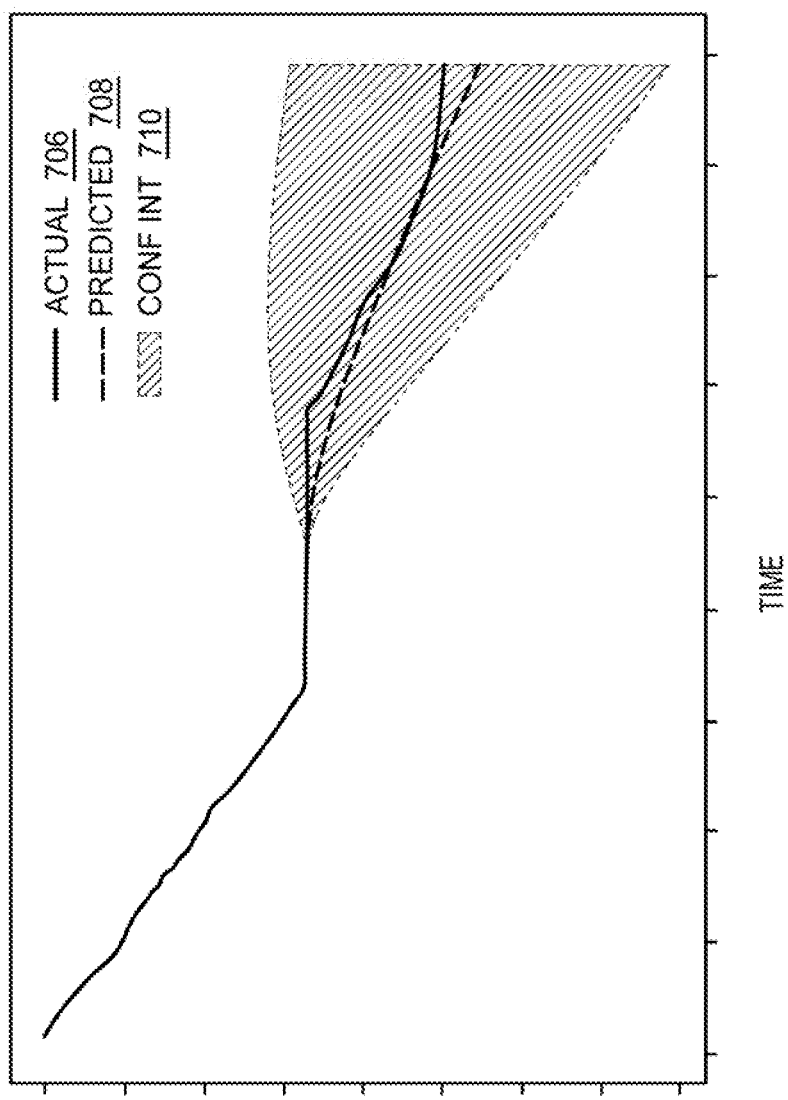

FIGS. 7A and 7B depict example application input and output based on a finite rank deep kernel learning model. As described above, a finite rank deep kernel learning model may be used to forecast financial transactions, such as a user's financial transactions over time, concurrently with a prediction of the confidence of those forecasts.

FIG. 7A depicts a table of historical user financial transaction data 702, which includes data related to multiple users (e.g., U1-U3), a range of dates of transactions, and transaction amounts. The data in table 702 may be processed by a finite rank deep kernel leaning model to produce output including forecasted values as well as an uncertainty measure for the forecasted values as depicted in table 704. The uncertainty measure may be used to form a confidence interval, as depicted in FIG. 7B, which depicts forecasted data for one of the users in tables 702 and 704. In this example, confidence interval 710 is a 95% confidence interval, but in other examples, it may be any other confidence interval.

FIG. 7B depicts a graphical forecast output showing actual data 707 as well as the forecasted data 708 with a confidence interval 710. As seen here again, despite having an irregular geometry, the finite rank deep kernel learning model is able to accurately model the actual data while providing simultaneous and time-dependent uncertainty quantification.

The prediction of financial transactions (e.g., cash flow) over time along with confidence intervals can improve the types of financial services offered to users. This is especially true where an organization wants to limit "false positive" alerts, such as an alert that the user's predicted cash flow would underrun their current bank account balance. Thus, the confidence interval can improve the ability to tune such alerts for user experience.

A second example application is forecasting computer resource utilization, including local and cloud-based resources. Computer resource utilization is particularly challenging to forecast over longer periods of time given it has cyclical and non-cyclical elements in addition to significant variability at any given time. This sort of complex geometry time series data is again an excellent candidate for analysis by a finite rank deep kernel learning model. In particular, in addition to creating better forecasts of resource utilization (and therefore needs) as compared to conventional modelling methods, finite rank deep kernel learning provides more accurate confidence intervals on the forecasts, which allows for strategic planning. For example, accurately forecasting computing resource utilization may create the opportunity to contract for cloud-based resources well in advance for better prices than spot prices for on-demand needs. Similarly, accurately forecasting computing resource utilization may create the opportunity to plan for resource expansion and allocate budget over a longer period of time. Further yet, the use of finite rank deep kernel learning may be a contributing factor in reducing resource utilization based on its significantly more efficient performance characteristics as compared to conventional modelling methods.

A third example application is detecting anomalous behavior to identify security risks e.g., from user log data or cloud based application logs. By nature, the more data captured regarding user behavior provides for more opportunities for detecting anomalies. But historically, significantly increasing the amount of captured user data (e.g., log data), meant likewise significantly increasing the amount of data that needed processing, the time to process it, the time to train models, etc. However, by using a computationally efficient method such as finite rank deep kernel learning, more data can be captured and processed without the conventional unsustainable increase in processing demand. Further, finite rank deep kernel learning creates more accurate confidence bounds, the detection accuracy (e.g., of anomalous behavior) is improved because the confidence of what is and is not anomalous is likewise improved.

A fourth example application is resource planning, for example, for online customer support. Some organizations may have significantly variable seasonal human resource needs. By way of example, a tax preparation organization may require significantly more human resources during tax preparation season as compared to the off-season. However, this sort of need is difficult to forecast given the complex nature of the underlying data. Finite rank deep kernel learning is well-suited for this task because it can learn with significant granularity local patterns in datasets. For example, as described above, the dot kernels provide a means for capturing localized data trends in a dataset while still creating a forecast that matches the characteristics of the dataset as a whole.

Many other example applications exist. Because the aforementioned application examples all likely involve very large datasets, the finite rank deep kernel learning method disclosed herein would significant improve processing system performance in terms of processing cycles, total cycle time, memory usage, and others.

Example Simulation Results Using Finite Rank Deep Kernel Learning Models

Figure 8A:
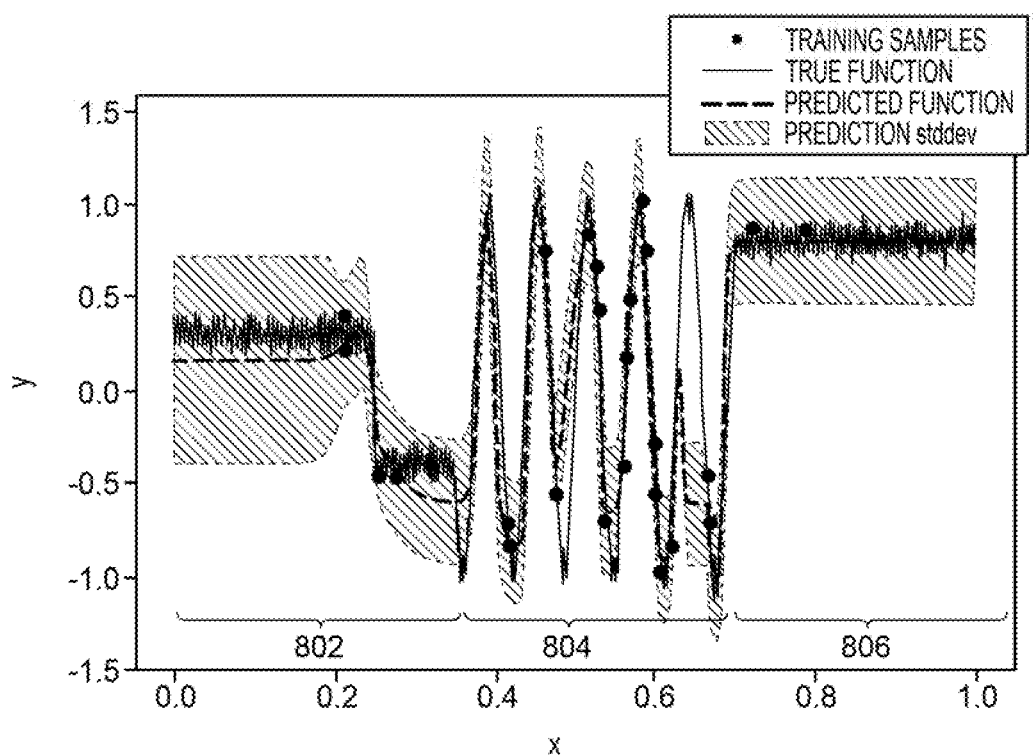
FIG. 8A depicts a synthetic dataset that has been forecasted using a finite rank deep kernel learning method
Figure 8B:
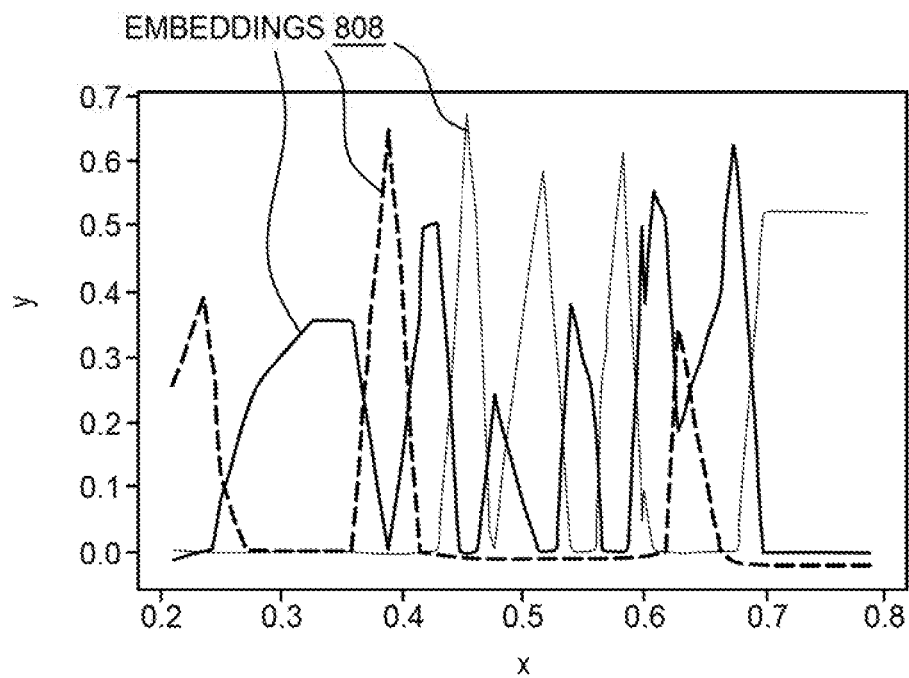
FIG. 8B depicts finite rank orthogonal embeddings corresponding to the prediction function depicted in FIG. 8A.

FIG. 8A depicts a synthetic dataset that has been forecasted using a finite rank deep kernel learning method as described herein. The corresponding finite rank orthogonal embeddings $\phi_i(x)$ of the prediction function in FIG. 8A (and based on the dataset depicted in FIG. 8A) are depicted in FIG. 8B. As depicted, the dataset in FIG. 8A has a complex geometry wherein different portions 802, 804, and 806 of the dataset have distinctly different geometries.

FIG. 8A further depicts a "true" function, a predicted function finite rank deep kernel learning), and a predicted standard deviation, which acts as an uncertainty or confidence interval, in this example, the predicted function closely approximates the true function in each of the different portions (802, 804, and 806), despite the very different geometries in those sections.

FIG. 8B depicts an example of the approximately orthogonal embeddings $\phi_i(x)$ (808) that form the basis of the dot kernels, which when combined into a composite (i.e., expressive) kernel, create the output depicted in FIG. 8A. The orthogonality of the embeddings shows the expressive power of the linear combination of dot kernels (i.e., composite kernel). In particular, these dot kernels tease out the local relationships in the underlying dataset. The dot kernels can further be combined to form the Gaussian process kernel. Hence, the dot kernels inherently identify clusters of data in the dataset while learning the pattern of the overall dataset simultaneously. The clustering of the dataset into groups allows the neural network to learn the local geometries in a decoupled fashion. The benefit of this approach is that the deep neural network can more accurately fit regions of the dataset in cases of datasets with discontinuities.

Figure 9A:
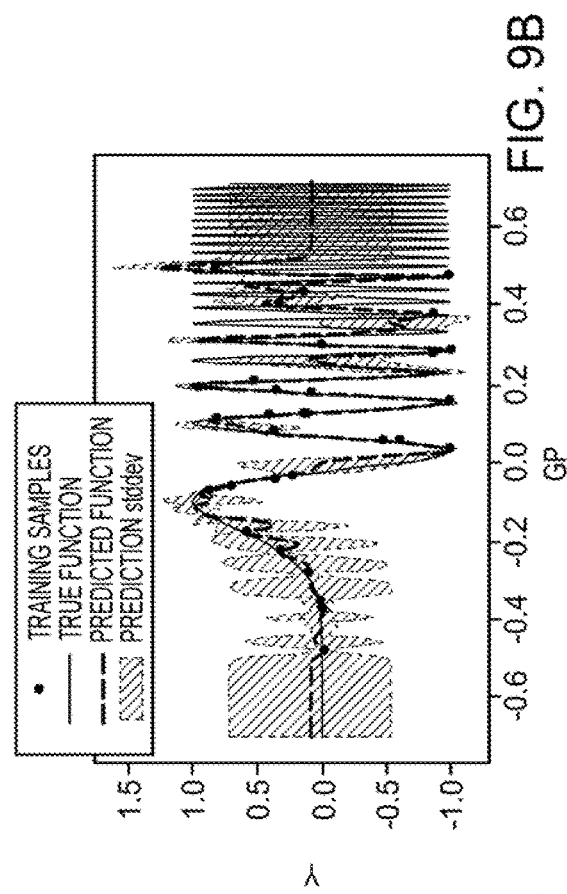
FIGS. 9A-9D depict a first example simulation comparing the performance of different modeling techniques, including deep kernel learning.
Figure 9B:
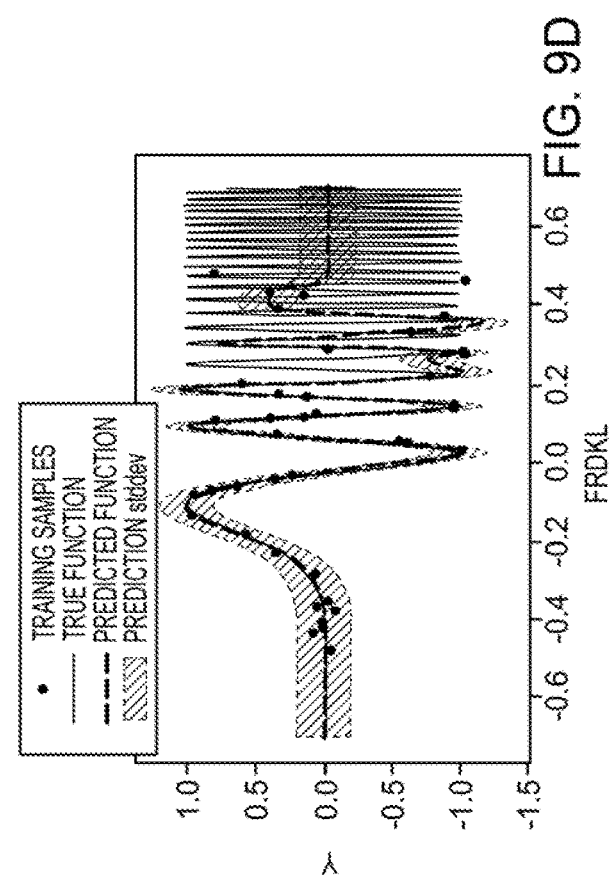
Figure 9C:
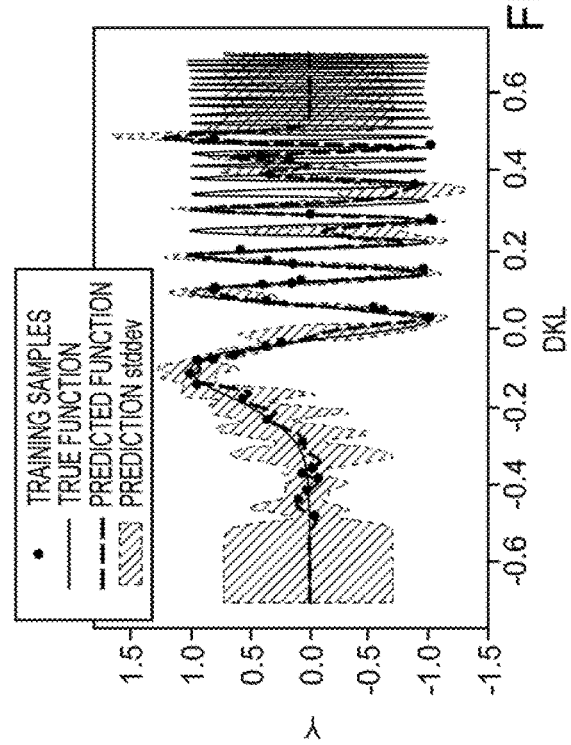
Figure 9D:
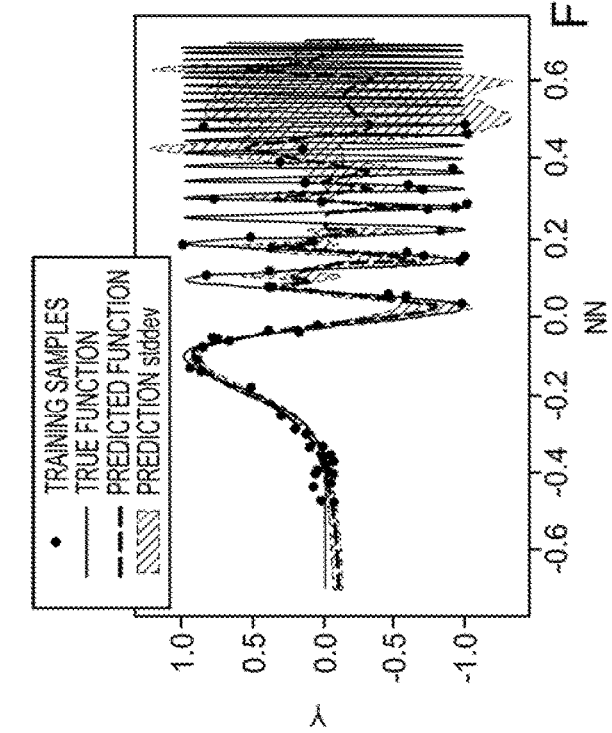

FIGS. 9A-9D depict another example simulation comparing the performance of different modeling techniques, including deep kernel learning FIG. 9A, Gaussian process FIG. 9B, bag of neural networks FIG. 9C, and finite rank deep kernel learning FIG. 9D, which is described herein, using a time series dataset. In this example, the time series dataset is based on a sinusoidal function whose frequency increases as the square of x. Additionally, heteroscedastic noise has been added to the function such that the noise magnitude increases from the left to right.

It is apparent from the simulation results that the bag of neural network method (c) underestimates the confidence intervals near the noisy region and overestimates the confidence in the high frequency region. For both deep kernel learning (a) and Gaussian process (b), it is apparent that the confidence intervals fluctuate heavily near the noisy region.

By contrast, the finite rank deep kernel learning method (d) produces confidence bounds that are relatively stable and that capture regions of high noise and fluctuations. Thus, the finite rank deep kernel learning method shows significant improvement in the ability to both forecast values based on a dataset with complex geometry while providing accurate quantification of uncertainty via confidence intervals as compared to the conventional methods in (a)-(c).

FIGS. 10A-10D depict another example simulation comparing the results of different modeling techniques based on a logistic map example. In this example, the logistic map is a chaotic but deterministic dynamical system $x_{n+1}=rx_n(1-x_n)$, where $x_n \in S_1$. The time series data is generated by the system for r=4:1, which falls in the region of strange attractor. In general, strange attractor signifies deterministic chaos, which is difficult to forecast. Thus, performance of a modeling framework, such as finite rank deep kernel learning, may be assessed by, for example, modeling a time series that is deterministically chaotic.

Figure 10B:
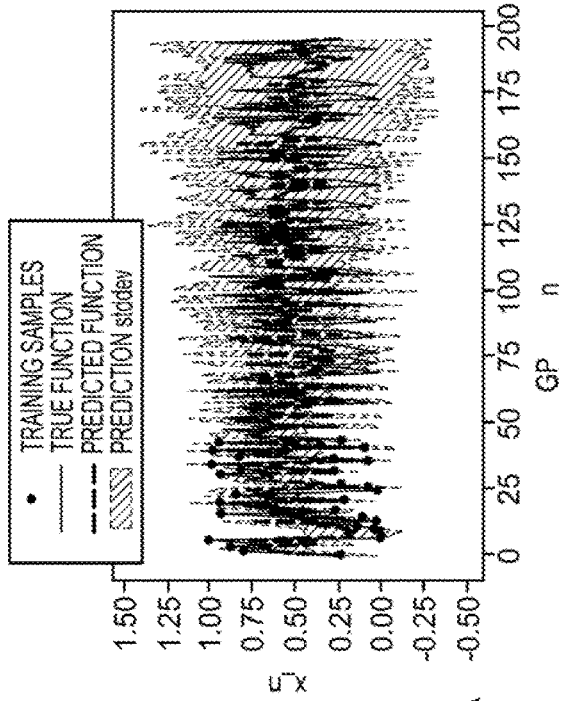
FIGS. 10A-10D depict a second example simulation comparing the performance of different modeling techniques, including deep kernel learning.
Figure 10D:
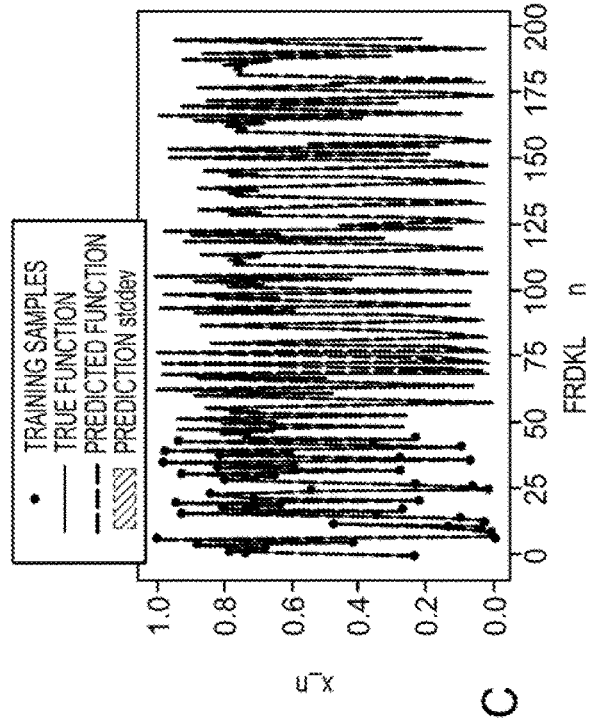
Figure 10A:
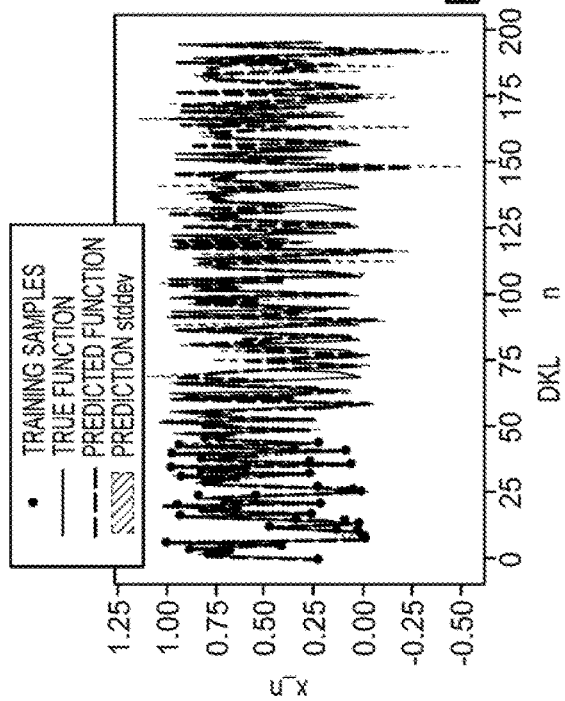
Figure 10C:
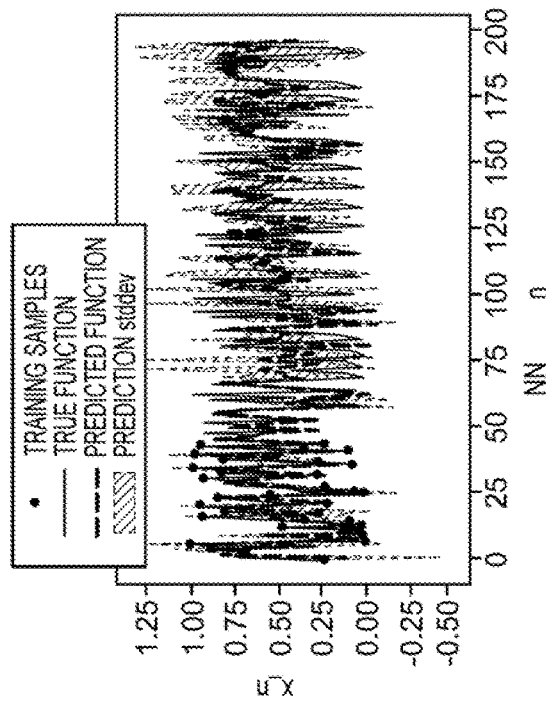

In this example, the Gaussian process FIG. 10B and bag of neural network FIG. 10C outputs have overly wide confidence intervals, and these models erroneously identify chaos as noise. The deep kernel learning FIG. 10A output has confidence bounds that are relatively moderate, but does not track the true function particularly closely.

By contrast, the finite rank deep kernel learning method FIG. 10D correctly captures the chaotic time series with very narrow confidence bounds.

FIGS. 11A-11D depicts another example simulation comparing the results of different modeling techniques based on a regression dataset. In this case, a normalized root mean squared error was calculated as a measure of accuracy, which is computed as the root mean squared error of a predictor divided by the standard error of the samples. In general, a normalized root mean squared error<1 would be a threshold for any predictor performing better than the sample mean.

In this example, the normalized root mean squared error values were found to be 0.41 for deep kernel learning FIG. 11A and 0.25 for finite rank deep kernel learning FIG. 11D—representing a near 40% improvement in model predictive performance. Further, the average CPU time lapsed for one epoch during the model training was 0.32 sec for deep kernel learning and 0.079 sec for finite rank deep kernel learning—representing a near 76% improvement. Further, the inference time was 0.03 seconds for deep kernel learning and 0.01 seconds for finite rank deep kernel learning—representing a 67% performance improvement.

Taken collectively, FIGS. 9A-11D demonstrate that finite rank deep kernel learning outperforms conventional modeling methods, including conventional deep kernel learning, both in terms of accuracy as well as computational efficiency.

Example Processing System

Figure 12:
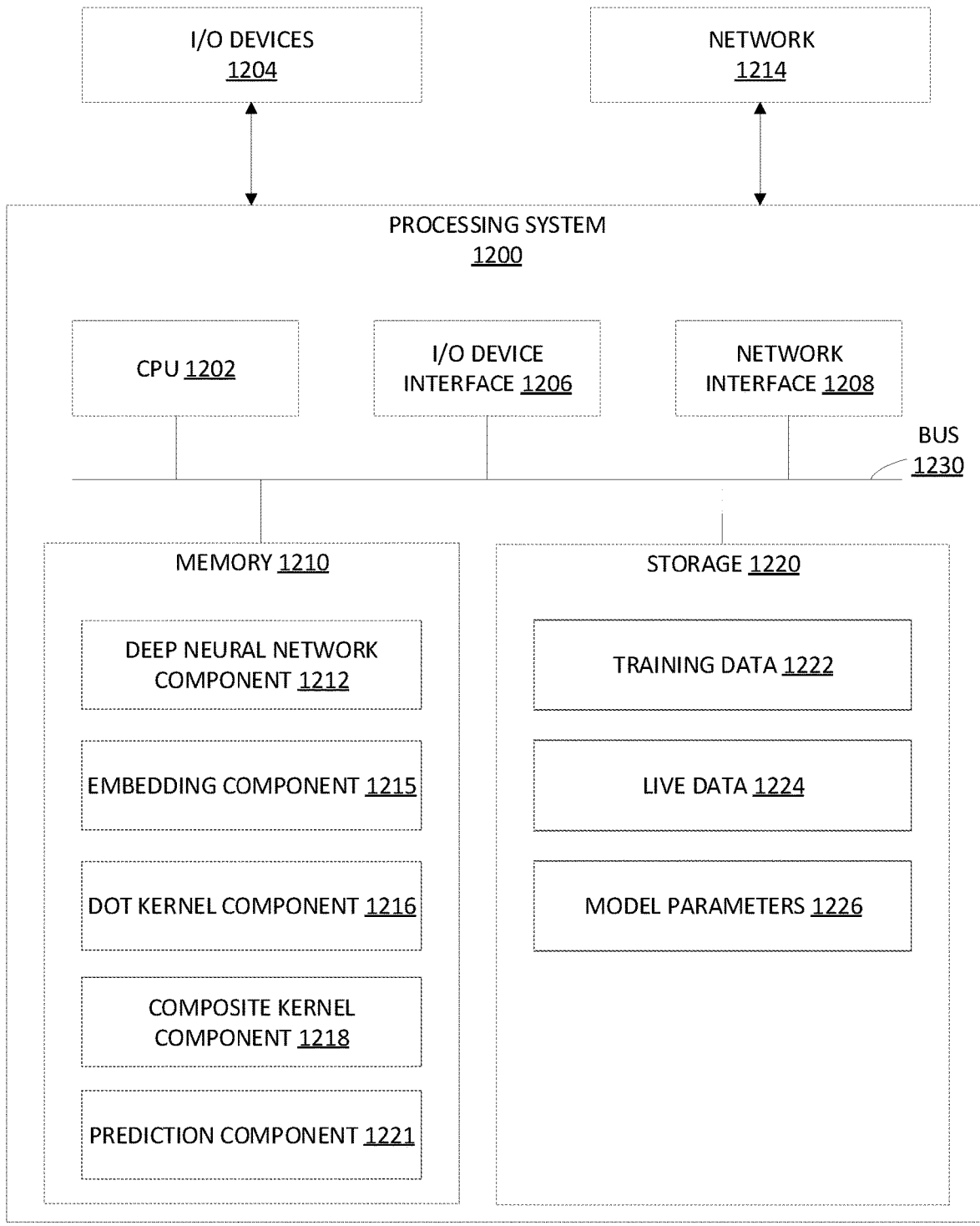
FIG. 12 depicts an example processing system for performing finite rank deep kernel learning.

FIG. 12 depicts an example processing system 1200 for performing finite rank deep kernel learning. For example, processing system 1200 may be configured to perform one or more aspects of flow 200 described with respect to FIG. 2 and method 500 described with respect to FIG. 5.

Processing system 1200 includes a CPU 1202 connected to a data bus 1230. CPU 1202 is configured to process computer-executable instructions, e.g., stored in memory 1210 or storage 1220, and to cause processing system 1200 to perform methods as described herein, for example with respect to FIGS. 2 and 5. CPU 1202 is included to be representative of a single CPU, multiple CPUs, a single CPU having multiple processing cores, and other forms of processing architecture capable of executing computer-executable instructions.

Processing system 1200 further includes input/output device(s) 1204 and input/output interface(s) 1206, which allow processing system 1200 to interface with input/output devices, such as, for example, keyboards, displays, mouse devices, pen input, and other devices that allow for interaction with processing system 1200.

Processing system 1200 further includes network interface 1208, which provides processing system 1200 with access to external networks, such as network 1214.

Processing system 1200 further includes memory 1210, which in this example includes a plurality of components.

For example, memory 1210 includes deep neural network component 1212, which is configured to perform deep neural network functions as described above.

Memory 1210 further includes embedding component 1215, which is configured to determine embeddings based on output from neural deep neural network component 1212. For example, embedding component 1215 may identify orthogonal embeddings for use in creating a plurality of dot kernels.

Memory 1210 further includes dot kernel component 1216, which is configured to determine dot kernels based on the embeddings determined by embedding component 1215.

Memory 1210 further includes composite kernel component 1218, which is configured to create composite (i.e., expressive) kernels from the dot kernels determined by dot kernel component 1216. For example, composite kernel component 1218 may be configured to linearly combine a plurality of dot kernels to determine a composite kernel. Memory 1210 further includes prediction component 1221, which is configured to determine predictions as described herein.

Note that while shown as a single memory 1210 in FIG. 12 for simplicity, the various aspects stored in memory 1210 may be stored in different physical memories, but all accessible CPU 1202 via internal data connections, such as bus 1230.

Processing system 1200 further includes storage 1220, which in this example includes training data 1222, live data 1224, and model parameters 1226. Training data 1222 may be, as described above, data used to train a finite rank deep kernel learning model. Live data 1224 may be data provided, for example, by an application, which is to be acted upon by the finite rank deep kernel leaning model. Model parameters 1226 may be parameters related to, for example, the deep neural network used to determine embeddings, as described above.

While not depicted in FIG. 12, other aspects may be included in storage 1210.

As with memory 1210, a single storage 1220 is depicted in FIG. 12 for simplicity, but the various aspects stored in storage 1220 may be stored in different physical storages, but all accessible to CPU 1202 via internal data connections, such as bus 1230, or external connection, such as network interface 1208.

Example Clauses

Clause 1: A finite rank deep kernel learning method, comprising: receiving a training dataset; forming a plurality of training data subsets from the training dataset; for each respective training data subset of the plurality of training data subsets: calculating a subset-specific loss based on a loss function and the respective training data subset; and optimizing a model based on the subset-specific loss; determining a set of embeddings based on the optimized model; determining, based on the set of embeddings, a plurality of dot kernels; and combining the plurality of dot kernels to form a composite kernel for a Gaussian process.

Clause 2: The method of Clause 1, further comprising: receiving live data from an application; and predicting a plurality of values and a plurality of uncertainties associated with the plurality of values simultaneously using the composite kernel.

Clause 3: The method of any one of Clauses 1-2, wherein the composite kernel for the Gaussian process is modeled as a linear combination of the plurality of dot kernels as: $K(x,y)=\sum_{i=1}^{R} \phi_i(x,\omega)\phi_i(y,\omega)$.

Clause 4: The method of any one of Clauses 1-3, wherein optimizing the model comprises minimizing the loss function, the loss function comprising:

$$\text{a data fit loss component} = \sigma^{-2}\|y\|_2^2 - \sum_{i=1}^{R} \frac{\langle\phi_i(X), y\rangle^2}{\sigma^2(\sigma^2 + \|\phi_i(X)\|_2^2)};$$

$$\text{a complexity component} = \sum_{i=1}^{R} \log(\sigma^2 + \|\phi_i(X)\|_2^2) + (N-R)\log\sigma^2;$$

$$\text{and a regularity loss component} = \lambda\sigma^{-2}\|y\|_2^2 \sum_{i<j} \frac{\langle\phi_i(X), \phi_j(X)\rangle^2}{\|\phi_i(X)\|_2^2\|\phi_j(X)\|_2^2}.$$

Clause 5: The method of any one of Clauses 2-4, wherein predicting the plurality of values comprises determining a mean value of each prediction E[y*] of the plurality of predictions according to:

$$\sum_{i=1}^{R} \frac{\langle\phi_i(X), y\rangle}{\sigma^2 + \|\phi_i(X)\|_2^2}\phi_i(X^*).$$

Clause 6: The method of Clause 5, wherein predicting the plurality of uncertainties comprises: determining a covariance of each prediction (cov [y*]) of the plurality of predictions according to:

$$\sum_{i=1}^{R} \frac{\sigma^2}{\sigma^2 + \|\phi_i(X)\|_2^2}\phi_i(X^*)\phi_i(X^*)^T;$$

and determining a variance of each prediction y* a diagonal of the of cov [y*].

Clause 7: The method of Clause 6, wherein each prediction of the plurality of predictions is determined according to $\{\hat{y}_{T+\Delta_F}, \hat{\sigma}_{T+\Delta_F}\}=\sum_{\tau=0}^{n}M(\tau, \Delta_F, y_{\tau-w}, \ldots, y_\tau)$, where $\hat{y}_{T+\Delta_F}$ is a mean prediction at a time $\Delta_F$ steps in the future, and $\hat{\sigma}_{T+\Delta_F}$ is the uncertainty of the mean prediction.

Clause 8: The method of any one of Clauses 2-7, wherein: the live data comprises financial data, the application is a financial management application, the plurality of values comprises a plurality of predicted future financial transactions, and each uncertainty of the plurality of uncertainties associated with a respective predicted future financial transaction estimates a range of values of the respective predicted future transaction.

Clause 9: The method of any one of Clause 2-7, wherein: the live data comprises resource utilization data, the application is a resource management application, the plurality of values comprises a plurality of predicted resources needs, and each uncertainty of the plurality of uncertainties associated with a respective predicted future resource need estimates a range of values of the respective resource need.

Clause 10: The method of any one of Clauses 2-7, wherein: the live data is user activity data, the application is a resource access control application, the plurality of values comprises a plurality of predicted user activities, and each uncertainty of the plurality of uncertainties associated with a respective predicted future user activity estimates a range of values of the respective user activity.

Clause 11: A processing system, comprising: a memory comprising computer-executable instructions; and one or more processors configured to execute the computer-executable instructions and cause the processing system to perform a method in accordance with any one of Clauses 1-10.

Clause 12: A non-transitory computer-readable medium comprising computer-executable instructions that, when executed by one or more processors of a processing system, cause the processing system to perform a method in accordance with any one of Clauses 1-10.

Clause 13: A computer program product embodied on a computer readable storage medium comprising code for performing a method in accordance with any one of Clauses 1-10.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A finite rank deep kernel learning method, comprising:
   receiving a training dataset;
   forming a plurality of training data subsets from the training dataset;
   for each respective training data subset of the plurality of training data subsets:
   calculating a subset-specific loss based on a loss function and the respective training data subset; and optimizing a model based on the subset-specific loss, wherein optimizing the model comprises minimizing the loss function, the loss function comprising:

a data fit loss component = $\sigma^{-2}\|y\|_2^2 - \sum_{i=1}^{R}\frac{\langle\phi_i(X), y\rangle^2}{\sigma^2(\sigma^2 + \|\phi_i(X)\|_2^2)}$;

a complexity component = $\sum_{i=1}^{R}\log(\sigma^2 + \|\phi_i(X)\|_2^2) + (N-R)\log\sigma^2$;

and a regularity loss component = $\lambda\sigma^{-2}\|y\|_2^2\sum_{i<j}\frac{\langle\phi_i(X), \phi_j(X)\rangle^2}{\|\phi_i(X)\|_2^2\|\phi_j(X)\|_2^2}$.

wherein:
  σ represents uncertainty;
  y represents a response variable;
  i represents an index value;
  R represents a rank;
  $\phi_i$ represents an embedding for an entity corresponding to index i;
  X represents input data;
  N represents a total number of entities;
  λ represents regularization; and
  j represents a different index value;
determining a set of embeddings based on the optimized model;
determining, based on the set of embeddings, a plurality of dot kernels; and
combining the plurality of dot kernels to form a composite kernel for a Gaussian process.

2. The method of claim 1, wherein the composite kernel for the Gaussian process is modeled as a linear combination of the plurality of dot kernels as: $K(x,y)=\Sigma_{i=1}^{R}\phi_i(x,\omega)\phi_i(y,\omega)$, wherein K(x,y) represents the composite kernel for input value x and response variable y, and ω represents one or more weights.

3. The method of claim 1, further comprising:
receiving live data from an application; and
predicting a plurality of values and a plurality of uncertainties associated with the plurality of values simultaneously using the composite kernel.

4. The method of claim 3, wherein predicting the plurality of values comprises determining a mean value of each prediction of the plurality of predictions.

5. The method of claim 4, wherein predicting the plurality of uncertainties comprises:
determining a covariance of each prediction of the plurality of predictions; and
determining a variance of each prediction of the plurality of predictions.

6. The method of claim 3, wherein:
the live data comprises financial data,
the application is a financial management application,
the plurality of values comprises a plurality of predicted future financial transactions, and
each uncertainty of the plurality of uncertainties associated with a respective predicted future financial transaction estimates a range of values of the respective predicted future transaction.

7. The method of claim 3, wherein:
the live data comprises resource utilization data,
the application is a resource management application,
the plurality of values comprises a plurality of predicted resources needs, and
each uncertainty of the plurality of uncertainties associated with a respective predicted future resource need estimates a range of values of the respective resource need.

8. The method of claim 3, wherein:
the live data is user activity data,
the application is a resource access control application,
the plurality of values comprises a plurality of predicted user activities, and
each uncertainty of the plurality of uncertainties associated with a respective predicted future user activity estimates a range of values of the respective user activity.

9. A system, comprising:
a memory comprising computer-executable instructions;
one or more processors configured to execute the computer-executable instructions and cause the system to:
  receive a training dataset;
  form a plurality of training data subsets from the training dataset;
  for each respective training data subset of the plurality of training data subsets:
    calculate a subset-specific loss based on a loss function and the respective training data subset; and
    optimize a model based on the subset-specific loss, wherein optimizing the model comprises minimizing the loss function, the loss function comprising:

a data fit loss component = $\sigma^{-2}\|y\|_2^2 - \sum_{i=1}^{R}\frac{\langle\phi_i(X), y\rangle^2}{\sigma^2(\sigma^2 + \|\phi_i(X)\|_2^2)}$;

a complexity component = $\sum_{i=1}^{R}\log(\sigma^2 + \|\phi_i(X)\|_2^2) + (N-R)\log\sigma^2$;

and a regularity loss component = $\lambda\sigma^{-2}\|y\|_2^2\sum_{i<j}\frac{\langle\phi_i(X), \phi_j(X)\rangle^2}{\|\phi_i(X)\|_2^2\|\phi_j(X)\|_2^2}$.

wherein:
  σ represents uncertainty;
  y represents a response variable;
  i represents an index value;
  R represents a rank;
  $\phi_i$ represents an embedding for an entity corresponding to index i;
  X represents input data;
  N represents a total number of entities;
  λ represents regularization; and
  j represents a different index value;
determine a set of embeddings based on the optimized model;
determine, based on the set of embeddings, a plurality of dot kernels; and
combine the plurality of dot kernels to form a composite kernel for a Gaussian process.

10. The system of claim 9, wherein the composite kernel for the Gaussian process is modeled as a linear combination of the plurality of dot kernels as: $K(x,y)=\Sigma_{i=1}^{R}\phi_i(x,\omega)\phi_i(y,\omega)$, wherein K(x,y) represents the composite kernel for input value x and response variable y, and ω represents one or more weights.

11. The system of claim 9, wherein the one or more processors are further configured to cause the system to:
receive live data from an application; and predict a plurality of values and a plurality of uncertainties associated with the plurality of values simultaneously using the composite kernel.

12. The system of claim 11, wherein in order to predict the plurality of values, the one or more processors are further configured to determine a mean value of each prediction of the plurality of predictions.

13. The system of claim 12, wherein in order to predict the plurality of uncertainties, the one or more processors are further configured to:
   determine a covariance of each prediction of the plurality of predictions; and
   determine a variance of each prediction of the plurality of predictions.

14. The system of claim 11, wherein:
   the live data comprises financial data,
   the application is a financial management application,
   the plurality of values comprises a plurality of predicted future financial transactions, and
   each uncertainty of the plurality of uncertainties associated with a respective predicted future financial transaction estimates a range of values of the respective predicted future transaction.

15. The system of claim 11, wherein:
   the live data comprises resource utilization data,
   the application is a resource management application,
   the plurality of values comprises a plurality of predicted resources needs, and
   each uncertainty of the plurality of uncertainties associated with a respective predicted future resource need estimates a range of values of the respective resource need.

16. The system of claim 11, wherein:
   the live data is user activity data,
   the application is a resource access control application,
   the plurality of values comprises a plurality of predicted user activities, and
each uncertainty of the plurality of uncertainties associated with a respective predicted future user activity estimates a range of values of the respective user activity.

* * * * *